US012589709B2

(12) United States Patent
Ghannam et al.

(10) Patent No.: US 12,589,709 B2
(45) Date of Patent: Mar. 31, 2026

(54) SYSTEMS AND METHODS OF ADJUSTABLE COMPONENT MANAGEMENT FOR A VEHICLE

(71) Applicant: Ford Global Technologies, LLC, Dearborn, MI (US)

(72) Inventors: Mahmoud Yousef Ghannam, Canton, MI (US); Heba Abdallah, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 18/122,318

(22) Filed: Mar. 16, 2023

(65) Prior Publication Data

US 2024/0308456 A1     Sep. 19, 2024

(51) Int. Cl.
B60R 21/015        (2006.01)
B60R 21/01         (2006.01)
(Continued)

(52) U.S. Cl.
CPC ........ B60R 21/01538 (2014.10); B60R 21/16 (2013.01); G01S 17/894 (2020.01); G06T 7/521 (2017.01); G06V 10/34 (2022.01); G06V 20/593 (2022.01); B60R 2021/01231 (2013.01); G06T 2207/10028 (2013.01); G06T 2207/20044 (2013.01); G06T 2207/30196 (2013.01); G06T 2207/30268 (2013.01)

(58) Field of Classification Search
CPC ..... B60W 2420/408; B60W 2420/403; B60W 40/08; B60W 40/09; B60W 30/08; B60W 2540/229; B60W 2540/221; B60W 2540/223; B60W 2040/0818; B60W 2540/26; B60W 2554/4041; B60W 2540/043; B60W 30/09; B60W 2540/22; B60R 21/01512; B60R 1/00
See application file for complete search history.

(56) References Cited

U.S. PATENT DOCUMENTS

| | | | | |
|---|---|---|---|---|
| 6,027,138 | A | * | 2/2000 | Tanaka .............. B60R 21/01538 |
| | | | | 250/559.22 |
| 6,772,057 | B2 | * | 8/2004 | Breed ..................... G01S 15/87 |
| | | | | 280/735 |

(Continued)

*Primary Examiner* — Lindsay M Low
*Assistant Examiner* — Brian R Kirby
(74) *Attorney, Agent, or Firm* — Vichit Chea; Carlson, Gaskey & Olds, P.C.

(57)     ABSTRACT

A system for managing adjustments for a component of a vehicle includes a time-of-flight sensor configured to generate a point cloud representing a compartment of the vehicle. The system further includes an actuator configured to adjust the component of the vehicle. The system further includes processing circuitry in communication with the time-of-flight sensor and the actuator. The processing circuitry configured to detect an occupant in a seat of the vehicle based on the point cloud, define a first portion of the point cloud corresponding to the occupant and a second portion of the point cloud corresponding to the seat of the vehicle, calculate a volume of the occupant based on the first portion of the point cloud, estimate a bodyweight of the occupant based on the volume, and communicate an instruction to adjust the component of the vehicle in response to the estimation of the bodyweight.

26 Claims, 9 Drawing Sheets

(51) Int. Cl.

| | | |
|---|---|---|
| *B60R 21/16* | (2006.01) |
| *G01S 17/894* | (2020.01) |
| *G06T 7/521* | (2017.01) |
| *G06V 10/34* | (2022.01) |
| *G06V 20/59* | (2022.01) |

(56) References Cited

U.S. PATENT DOCUMENTS

| | | | | |
|---|---|---|---|---|
| 10,836,401 B1* | 11/2020 | Christensen | ...... | B60W 50/0098 |
| 10,850,693 B1* | 12/2020 | Pertsel | ................ | G06V 40/103 |
| 11,376,992 B2 | 7/2022 | D'Eramo et al. | | |
| 11,518,277 B2* | 12/2022 | Bove | .................... | B60R 16/037 |
| 2004/0061598 A1* | 4/2004 | King | .................... | B60R 21/013 |
| | | | | 340/435 |
| 2013/0148845 A1* | 6/2013 | Maeda | .................... | G08G 1/04 |
| | | | | 382/103 |
| 2014/0124004 A1* | 5/2014 | Rosenstein | .............. | G06T 7/00 |
| | | | | 15/3 |
| 2015/0370253 A1* | 12/2015 | Gurin | .................... | H04N 7/185 |
| | | | | 701/1 |
| 2016/0180289 A1* | 6/2016 | Siris | .................. | G06Q 10/0833 |
| | | | | 702/150 |
| 2017/0046845 A1* | 2/2017 | Boyle | .................... | G06T 7/521 |
| 2018/0272977 A1* | 9/2018 | Szawarski | .............. | B60R 11/04 |
| 2019/0108396 A1* | 4/2019 | Dal Mutto | ............. | G06N 3/047 |
| 2019/0375312 A1* | 12/2019 | Petersson | .......... | B60R 21/01554 |
| 2020/0171977 A1 | 6/2020 | Jales Costa et al. | | |
| 2020/0406902 A1* | 12/2020 | McBride | .............. | B60W 40/08 |
| 2021/0150754 A1* | 5/2021 | Tanaka | ................ | G06V 40/103 |
| 2021/0155185 A1 | 5/2021 | Christensen et al. | | |
| 2021/0179117 A1* | 6/2021 | Glazman | ............. | B60R 21/0136 |
| 2022/0067410 A1* | 3/2022 | Raz | .................... | A61B 5/7264 |
| 2022/0114817 A1* | 4/2022 | Gronau | ................... | G06T 7/70 |
| 2022/0198696 A1* | 6/2022 | Jones | ........................ | G06T 7/62 |
| 2022/0256123 A1* | 8/2022 | Parenti | .................... | G06N 3/09 |
| 2022/0281460 A1* | 9/2022 | Lin | ....................... | B60W 40/08 |
| 2022/0292705 A1* | 9/2022 | Friedman | ............. | H04N 13/25 |
| 2023/0001930 A1* | 1/2023 | Moidunny | ........... | A61B 5/1116 |

* cited by examiner

Points
132a – Skull Base
132b – Neck
132c – Torso Top
132d – Torso Middle
132e – Torso Base
132f – Right Shoulder
132g – Right Elbow
132h – Right Wrist
132i – Left Shoulder
132j – Left Elbow
132k – Left Wrist
132l – Right Hip
132m – Right Knee
132n – Right Ankle
132o – Right Mid Foot
132p – Left Hip
132q – Left Knee
132r – Left Ankle
132s – Left Mid Foot Features
132t – Center of Head
132u – Right Eye
132v – Left Eye
132w – Right Ear
132x – Left Ear
132y – Nose
132z – Chest Center $$v_{seg1} = \pi r^2 h_{seg_1}$$
$$+$$
$$v_{seg2} = \pi r^2 h_{seg_2}$$
$$+$$
$$\cdots$$

SYSTEMS AND METHODS OF ADJUSTABLE COMPONENT MANAGEMENT FOR A VEHICLE

FIELD OF THE DISCLOSURE

The present disclosure generally relates to managing adjustable components for a vehicle and, more specifically to managing actuation of components of the vehicle based on occupancy of the vehicle.

BACKGROUND OF THE DISCLOSURE

Conventional monitoring techniques may involve complex image processing algorithms to detect depth. The need for dynamic depth detection is desired.

SUMMARY OF THE DISCLOSURE

According to a first aspect of the present disclosure, a system for managing adjustments for a component of a vehicle includes a time-of-flight sensor configured to generate a point cloud representing a compartment of the vehicle. The point cloud includes three-dimensional positional information about the compartment. The system further includes at least one actuator configured to adjust the component of the vehicle. The system further includes processing circuitry in communication with the time-of-flight sensor and the at least one actuator, the processing circuitry configured to detect an occupant in a seat of the vehicle based on the point cloud, define a first portion of the point cloud corresponding to the occupant and a second portion of the point cloud corresponding to the seat of the vehicle, calculate a volume of the occupant based on the first portion of the point cloud, estimate a bodyweight of the occupant based on the volume, and communicate an instruction to adjust the component of the vehicle in response to the estimation of the bodyweight.

Embodiments of the first aspect of the present disclosure can include any one or a combination of the following features:

the processing circuitry is further configured to calculate a product of the volume of the occupant and a density estimate, wherein the estimation of the bodyweight is based on the product of the volume of the occupant and the density estimate;

a database in communication with the processing circuitry, the database including skeleton model data, wherein the processing circuitry is further configured to define a skeleton model for the occupant based on the point cloud and the skeleton model data;

the processing circuitry is further configured to determine a pose of the occupant based on the first portion of the point cloud and the skeleton model;

the skeleton model includes keypoints corresponding to a central axis of body segments of the occupant, the processing circuitry further configured to compare the keypoints to the first portion of the point cloud, calculate a part of the volume for each of the body segments based on the comparison of the keypoints to the first portion, and calculate a sum of the parts of the volume to determine the volume of the occupant;

processing circuitry is further configured to compare the first portion of the point cloud to the second portion of the point cloud, and estimate a coronal plane for the occupant based on the comparison of the first portion to the second portion;

the skeleton model includes keypoints corresponding to the coronal plane of the occupant, and calculation of the volume is based further on the keypoints;

estimation of the coronal plane is based on the processing circuitry, detecting a first depth of a front of the occupant based on the first portion, detecting a second depth of a seating surface of the seat based on the second portion, and calculating an average depth based on the first and second depths;

the processing circuitry is configured to define a third portion of the point cloud corresponding to a structural surface of the compartment, compare the first portion of the point cloud to the third portion of the point cloud, and adjust an activation of the at least one actuator based on the comparison of the first portion to the third portion;

the processing circuitry is further configured to determine an alignment vector between the first portion and the third portion of the point cloud, the adjustment of the activation is based further on the alignment vector;

the at least one component includes a restraint configured to align with the alignment vector upon deployment of the restraint;

adjustment to the activation includes adjusting a timing of the deployment based on the comparison of the first portion to the third portion;

the time-of-flight sensor includes at least one light detection and ranging (LiDAR) module configured to generate the three-dimensional positional information; and the at least one actuator is configured to adjust the seat.

According to a second aspect of the present disclosure, a method for managing adjustments for a component of a vehicle includes generating, via a time-of-flight sensor, a point cloud representing a compartment of the vehicle. The point cloud includes three-dimensional positional information about the compartment. The method further includes detecting, via processing circuitry in communication with the time-of-flight sensor, an occupant in a seat of the vehicle based on the point cloud. The method further includes defining a first portion of the point cloud corresponding to the occupant and a second portion of the point cloud corresponding to the seat of the vehicle. The method further includes calculating, via the processing circuitry, a volume of the occupant based on the first portion of the point cloud. The method further includes estimating a bodyweight of the occupant based on the volume. The method further includes communicating, via the processing circuitry, an instruction to adjust the component of the vehicle via at least one actuator in response to the estimation of the bodyweight.

Embodiments of the second aspect of the present disclosure can include any one or a combination of the following features:

defining a skeleton model for the occupant based on the point cloud and skeleton model data in a skeleton model database that is in communication with the processing circuitry;

determining a pose of the occupant based on the first portion of the point cloud and the skeleton model;

the skeleton model includes keypoints corresponding to a central axis of body segments of the occupant, and further includes comparing the keypoints to the first portion of the point cloud, calculating a part of the volume for each of the body segments based on the comparison of the keypoints to the first portion, and calculate a sum of the parts of the volume to determine the volume of the occupant; and comparing the first portion of the point cloud to the second portion of the point cloud, and estimating a coronal plane for the occupant based on the comparison of the first portion to the second portion.

According to a third aspect of the present disclosure, a system for managing adjustments for a component of a vehicle includes a time-of-flight sensor configured to generate a point cloud representing a compartment of the vehicle. The point cloud includes three-dimensional positional information about the compartment. The system further includes at least one actuator configured to adjust the component of the vehicle. The system further includes processing circuitry in communication with the time-of-flight sensor and the at least one actuator. The system further includes a database in communication with the processing circuitry, the database including skeleton model data, wherein the processing circuitry is configured to define a skeleton model for the occupant based on the point cloud and the skeleton model data, detect an occupant in a seat of the vehicle based on the point cloud, define a first portion of the point cloud corresponding to the occupant and a second portion of the point cloud corresponding to the seat of the vehicle, calculate a volume of the occupant based on the first portion of the point cloud and the skeleton model data, estimate a bodyweight of the occupant based on the volume, and communicate an instruction to adjust the component of the vehicle in response to the estimation of the bodyweight.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1A:
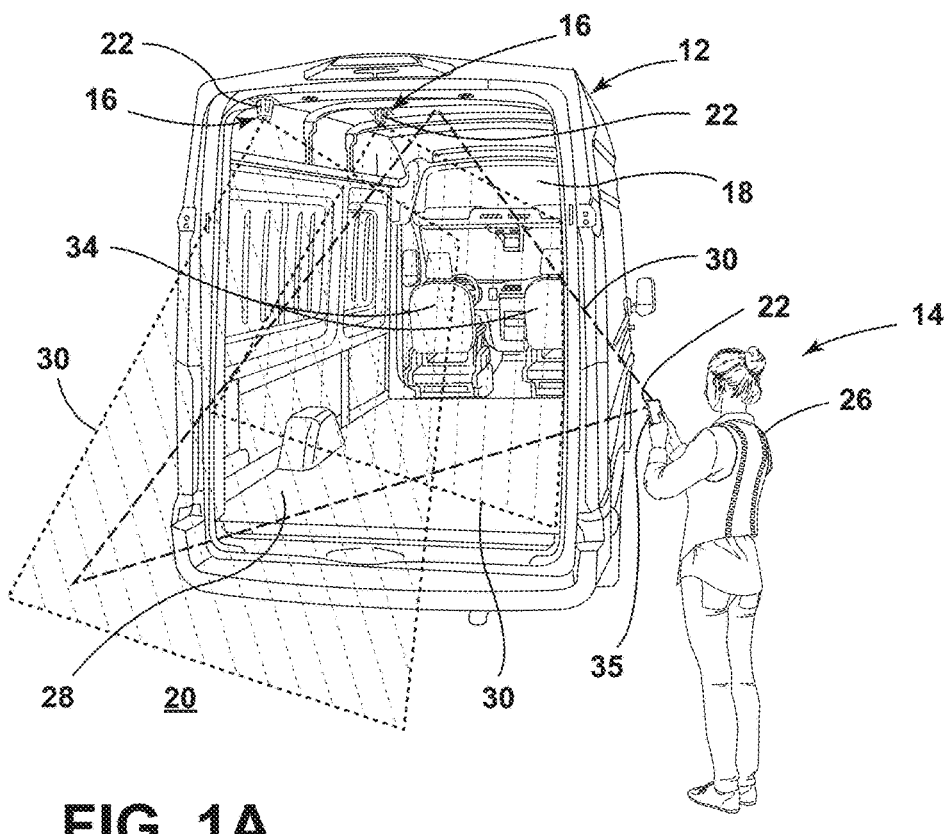
FIG. 1A is a perspective view of a cargo van incorporating a detection system of the present disclosure in a rear space of the cargo van.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to adjustable component management for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1A-5, the present disclosure generally relates to a detection system 10 for a vehicle 12 that utilizes three-dimensional image sensing to detect information about an environment 14 in or around the vehicle 12. The three-dimensional image sensing may be accomplished via one or more time-of-flight (ToF) sensors 16 that are configured to map a three-dimensional space such as an interior 18 of the vehicle 12 and/or a region exterior 20 to the vehicle 12. For example, the one or more time-of-flight sensors 16 may include at least one light detection and ranging (LiDAR) module 22 configured to output pulses of light, measure a time of flight for the pulses of light to return from the environment 14 to the at least one LiDAR module 22, and generate at least one point cloud 24 of the environment 14 based on the time-of-flight of the pulses of light. In this way, the LiDAR module 22 may provide information regarding three-dimensional shapes of the environment 14 being scanned, including geometries, proportions, or other measurement information related to the environment 14 and/or occupants 26 for the vehicle 12.

The LiDAR modules 22 of the present disclosure may operate conceptually similar to a still frame or video stream, but instead of producing a flat image with contrast and color, the LiDAR module 22 may provide information regarding three-dimensional shapes of the environment 14 being scanned. Using time-of-flight, the LiDAR modules 22 are configured to measure the round-trip time taken for light to be transmitted, reflected from a surface, and received at a sensor near the transmission source. The light transmitted may be a laser pulse. The light may be sent and received millions of times per second at various angles to produce a matrix of the reflected light points. The result is a single measurement point for each transmission and reflection representing distance and a coordinate for each measurement point. When the LiDAR module 22 scans the entire "frame," or field of view 30, it generates an output known as a point cloud 24 that is a 3D representation of the features scanned.

In some examples, the LiDAR modules 22 of the present disclosure may be configured to capture the at least one point cloud 24 independent of visible-light illumination of the environment 14. For example, the LiDAR modules 22 may not require ambient light to achieve the spatial mapping techniques of the present disclosure. For example, the LiDAR module 22 may emit and receive infrared (IR) or near-infrared (NIR) light, and therefore generate the at least one point cloud 24 despite visible-light conditions. Further, as compared to Radio Detection and Ranging (RADAR), the depth-mapping achieved by the LiDAR modules 22 may have greater accuracy due to the rate at which the LiDAR pulses may be emitted and received (e.g., the speed of light).

Further, the three-dimensional mapping may be achieved without utilizing radio frequencies (RF), and therefore may limit RF certifications for operation. Accordingly, sensors incorporated for monitoring frequencies and magnitudes of RF fields may be omitted by providing the present LiDAR modules 22.

Figure 1B:
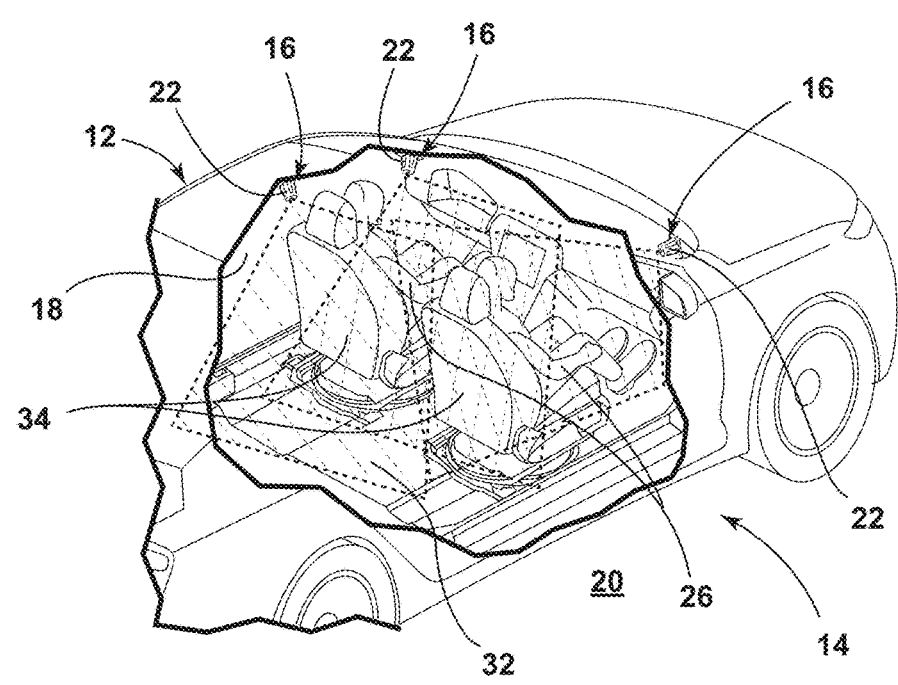
FIG. 1B is a perspective view of a car incorporating a detection system of the present disclosure in a passenger cabin of the car.

Referring now more particularly to FIGS. 1A and 1B, a plurality of the LiDAR modules 22 may be configured to monitor a compartment 28 of the vehicle 12. In the example illustrated in FIG. 1A, the LiDAR modules 22 are configured with a field of view 30 that covers the rear space of the vehicle 12, as well as the region exterior 20 to the vehicle 12. In this example, the region exterior 20 to the vehicle 12 is a space behind the vehicle 12 adjacent to an entry or an exit to the vehicle 12. In FIG. 1B, the plurality of LiDAR modules 22 are configured to monitor a front space of the vehicle 12, with the field of view 30 of one or more of the plurality of LiDAR modules 22 covering a passenger cabin 32 of the vehicle 12. As will be described further herein, it is contemplated that the plurality of LiDAR modules 22 may be in communication with one another to allow the at least one point cloud 24 captured from each LiDAR module 22 to be compared to one another to render a greater-accuracy representation of the environment 14. For example, and as depicted in FIG. 1A, the occupant 26 or another user may direct a mobile device 35 toward the environment 14 to generate an additional point cloud 24 from a viewing angle different than the field-of-views 30 of the LiDAR modules 22 of the vehicle 12. For example, the mobile device 35 may be a cellular phone having one of the LiDAR modules 22. In general, the time-of-flight sensors 16 disclosed herein may capture point clouds 24 of various features of the environment 14, such as seats 34, occupants 26, and various other surfaces or items present in the interior 18 or the region exterior 20 to the vehicle 12. As will further be discussed herein, the present system 10 may be operable to identify these features based on the at least one point cloud 24 and make determinations and/or calculations based on the identities, spatio-temporal positions of the features, and/or other related aspects of the features detected in the at least one point cloud 24.

Figure 2A:
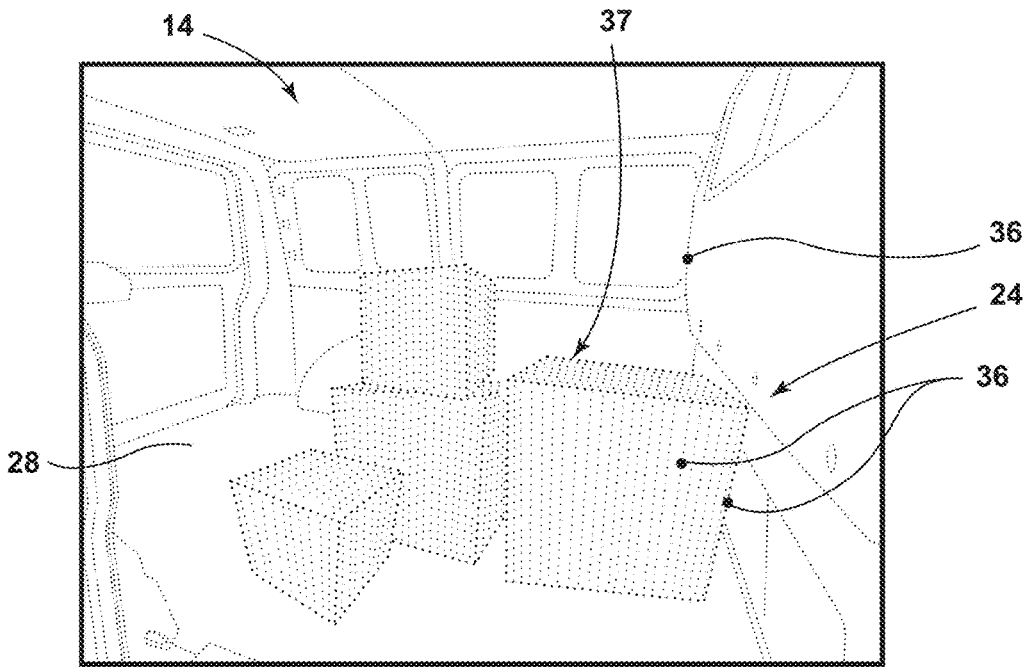
FIG. 2A is a representation of a point cloud generated by a time-of-flight sensor configured to monitor a rear space of a cargo van of the present disclosure.
Figure 2B:
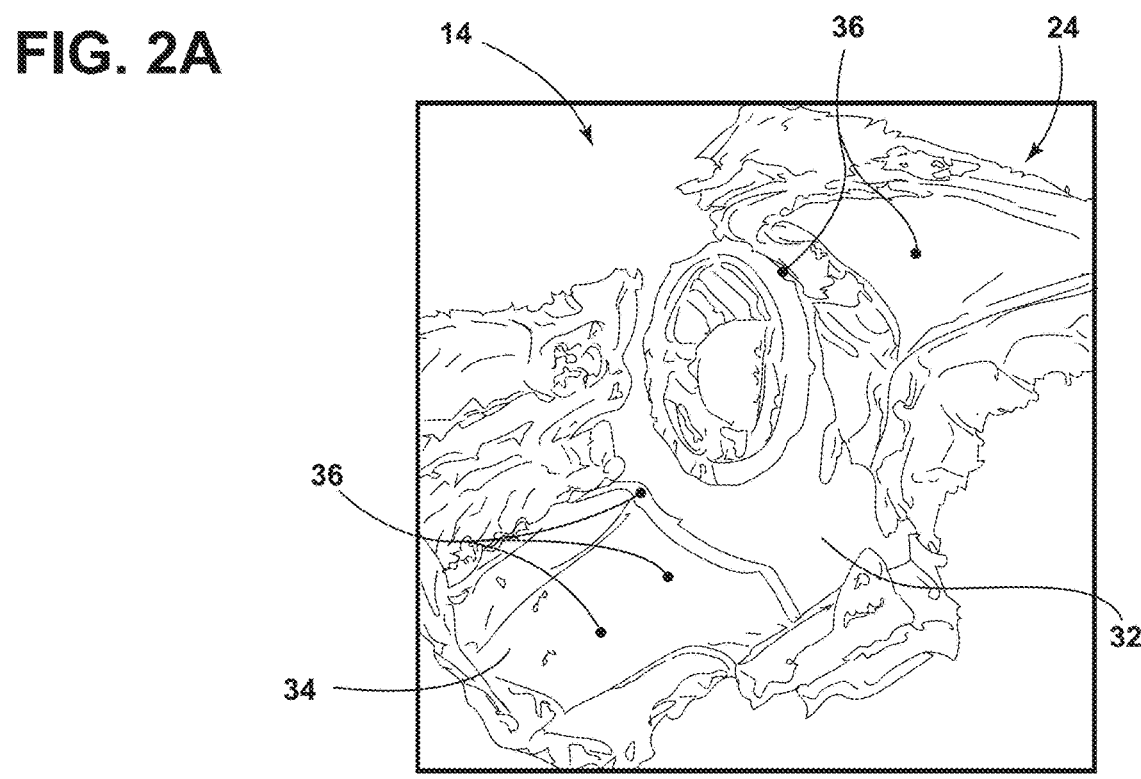
FIG. 2B is a representation of a point cloud generated by a time-of-flight sensor configured to monitor a passenger compartment of a vehicle of the present disclosure.

Referring now to FIGS. 2A and 2B, representations of at least one point cloud 24 generated from the LiDAR modules 22 in the interiors 18 of the vehicles 12 of FIGS. 1A and 1B, respectively, are presented to illustrate the three-dimensional mapping of the present system 10. For example, the depictions of the at least one point cloud 24 may be considered three-dimensional images constructed by the LiDAR modules 22 and/or processors in communication with the LiDAR modules 22. Although the depictions of the at least one point clouds 24 illustrated in FIGS. 2A and 2B may differ in appearance, it is contemplated that such difference may be a result of averaging depths of the points 36 of each point cloud 24 to render a surface (FIG. 2B) as opposed to individual dots (FIG. 2A). The underlying 3D data may be generated the same way in either case.

Still referring to FIGS. 2A and 2B, each point cloud 24 includes the three-dimensional data (e.g., a three-dimensional location relative to the LiDAR module 22) for the various features in the interior 18. For example, the at least one point cloud 24 may generate 3D mapping of the occupants 26 or cargo 37 in the interior 18. The three-dimensional data may include the rectilinear coordinates, with XYZ coordinates, of various points 36 on surfaces or other light-reflective features relative to the LiDAR module 22. It is contemplated that the coordinates of each point 36 may be virtually mapped to an origin point other than the LiDAR module 22, such as a center of mass of the vehicle, a center of volume of the compartment 28 being monitored, or any other feasible origin point. By obtaining the three-dimensional data of the various features in the interior 18 and, in some cases, the region exterior 20 to the vehicle 12, the detection system 10 may provide for enhanced monitoring methods to be performed without complex imaging methods, such as those incorporating stereoscopic imagers or other three-dimensional monitoring devices that may require higher computational power or decreased efficiencies.

Figure 3:
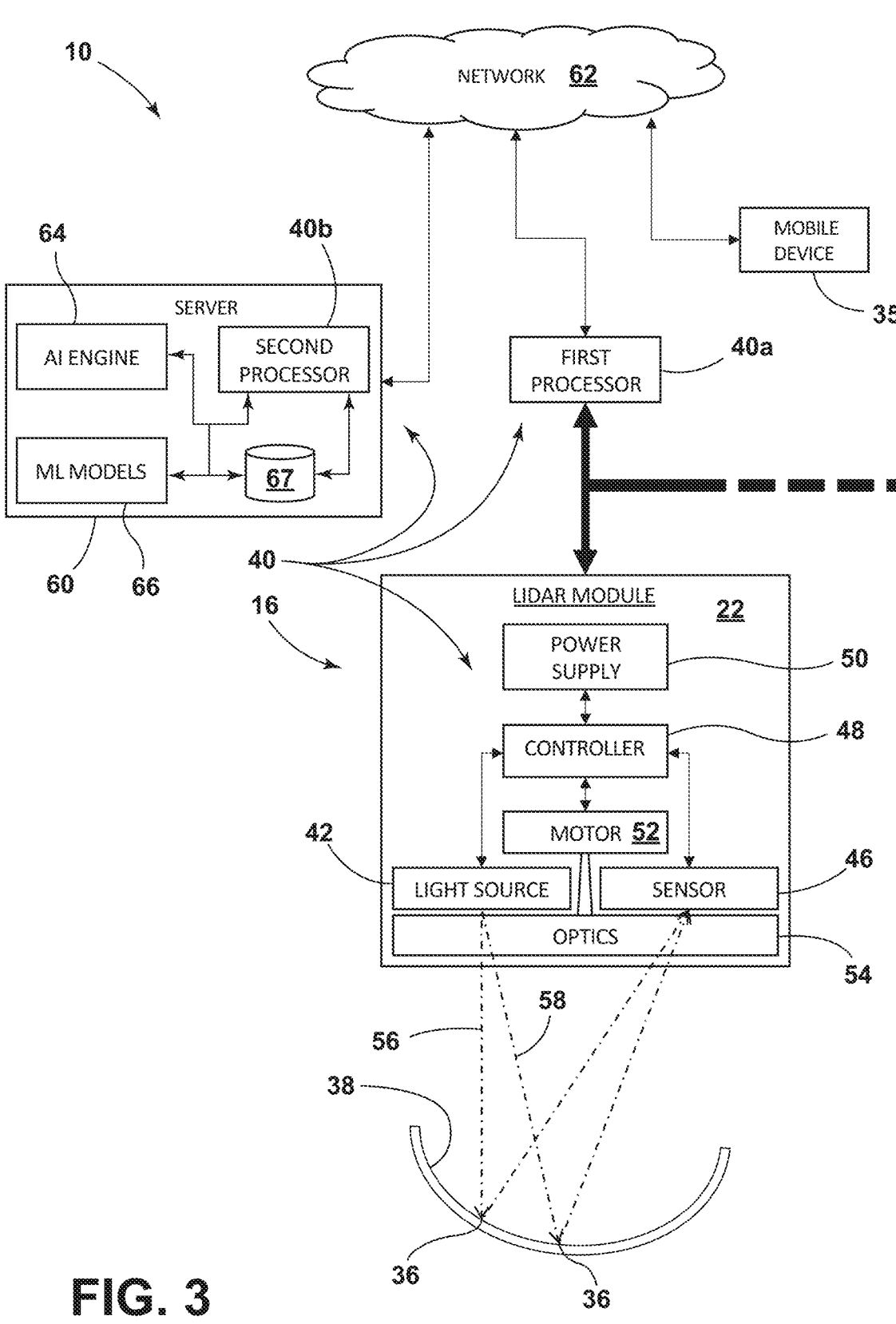
FIG. 3 is a block diagram of an exemplary detection system incorporating light detection and ranging.

Referring now to FIG. 3, at least a portion of the present detection system 10 is exemplarily applied to a target surface 38, such as to the cargo 37 or other surfaces in the environment 14 of the vehicle 12. The system 10 may include processing circuitry 40, which will be further discussed in relation to the proceeding figures, in communication with one or more of the time-of-flight sensors 16. In the present example, the time-of-flight sensors 16 include the LiDAR modules 22 each having a light source 42, or emitter, and a sensor 46 configured to detect reflection of the light emitted by the light source 42 off of the target surface 38. A controller 48 of the LiDAR module 22 is in communication with the light source 42 and the sensor 46 and is configured to monitor the time-of-flight of the light pulses emitted by the light source 42 and returned to the sensor 46. The controller 48 is also in communication with a power supply 50 configured to provide electrical power to the controller 48, the light source 42, the sensor 46, and a motor 52 that is controlled by the controller 48. In the present example, the LiDAR module 22 incorporates optics 54 that are mechanically linked to the motor 52 and are configured to guide the light pulses in a particular direction. For example, the optics 54 may include lenses or mirrors that are configured to change an angle of emission for the light pulses and/or return the light pulses to the sensor 46. For instance, the motor 52 may be configured to rotate a mirror to cause light emitted from the light source 42 to reflect off of the mirror at different angles depending on the rotational position of the motor 52.

In some examples, the optics 54 may include a first portion associated with the source 42 and a second portion associated with the sensor 46. For example, a first lens, which may move in response to the motor 52, may be configured to guide (e.g., collimate, focus) the light emitted by the source 42, and a second lens, which may be driven by a different motor or a different connection to the motor 52, may be configured to guide the light reflected off the target surface 38 and returned to the sensor 46. Accordingly, the general configuration of the LiDAR module 22 may incorporate a single housing having different sets of optics or a plurality of housings with different optics. For example, the source 42 may be located in a first housing of the LiDAR module 22, the sensor 46 may be located in a second housing separate from or spaced from the first housing. In this way, each of the LiDAR modules 22 may refer to any emitter/receiver combination system that emits LiDAR pulses and receives the LiDAR pulses either at a common location in the vehicle 12 or at different locations in the vehicle 12.

The light emitted and received by the present LiDAR modules 22 may have a wavelength in the range of between approximately 780 nanometers (nm) and 1700 nm. In some examples, the wavelength of the LiDAR is preferably in the range of between 900 nm and 1650 nm. In other examples, the wavelength of the LiDAR is preferably between 1500 nm and 1650 nm. In some examples, the wavelength of the LiDAR is preferably at least 1550 nm. It is contemplated that the particular wavelength/frequency employed by the LiDAR modules 22 may be based on an estimated distance range for capturing the depth information. For example, for shorter ranges (e.g., between 1 m and 5 m) the LiDAR may operate with a greater wavelength of light (e.g., greater than 1000 nm). The LiDAR modules 22 of the present disclosure may be configured to output light, in the form of a laser, at a wavelength of at least 1550 nm while the motor 52 rotates the optics 54 to allow mapping an area. In some examples, the LiDAR modules 22 of the present disclosure are configured to emit light having a wavelength of at least 1650 nm. Due to the relatively short distances scanned by the present LiDAR modules 22 (e.g., between one and five meters), such relatively low infrared (IR) or near-infrared (NIR) may be employed to achieve the three-dimensional spatial mapping via the at least one point cloud 24 with low power requirements. The present LiDAR modules 22 may be either single point-and-reflect modules or may operate in a rotational mode, as described above. In rotational mode, the LiDAR module 22 may measure up to 360 degrees based on the rate of rotation, which may be between 1 and 100 Hertz or may be at least 60 rotations per minute (RPM) in some examples.

In the example depicted in FIG. 3, the time-of-flight for a first pulse of light 56 emitted by the light source 42 and returned to the sensor 46 may be less than a second time-of-flight for a second light pulse emitted by the light source 42 returned to the sensor 46. For example, the first pulse of light 56 may travel a shorter distance than the second pulse of light 58 due to a difference in depth, height, or width of the corresponding reflection point 36 on the target surface 38. In this way, the LiDAR module 22 may generate the at least one point cloud 24 to be representative of the environment 14 (e.g., the target surface 38 in the present example) in three dimensions.

The processing circuitry 40 of the present disclosure may be provided to amalgamate the point cloud 24 from each of a plurality of the LiDAR modules 22 and process the coordinates of the features to determine an identity of the features, as well as to perform other processing techniques that will be further described herein. The processing circuitry 40 may include a first processor 40a local to the vehicle 12 and a second processor 40b remote from the vehicle 12. Further, the processing circuitry 40 may include the controller 48 of the LiDAR module 22. In some examples, the controller 48 may be configured to generate or determine the at least one point cloud 24 and/or point cloud data, and the first processor 40a may be configured to receive the at least one point cloud 24 from each LiDAR module 22 and compile each point cloud 24 of a common scene, such as the environment 14, to generate a more expansive or more accurate point cloud 24 of the environment 14.

The second processor 40b, which may be a part of a remote server 60 and in communication with the first processor 40a, via a network 62, may be configured to perform various modifications and/or mapping of the at least one point cloud 24 to target three-dimensional image data for the environment 14. For example, the server 60 may include an artificial intelligence (AI) engine 64 configured to train machine learning models 66 based on the point cloud data captured via the LiDAR modules 22 and/or historical data previously captured by the time-of-flight sensors 16. The second processor 40b may be in communication with the AI engine 64, as well as in communication with a database 67 configured to store the target point cloud data and/or three-dimensional image information. Accordingly, the server 60 may incorporate a memory storing instructions that, when executed by the processor, causes the processing circuitry 40 to compare the at least one point cloud 24 to point cloud data corresponding to target conditions of the interior 18 and/or the region exterior 20 to the vehicle 12. In this way, the detection system 10 may employ the processing circuitry 40 to perform advanced detection techniques and to communicate with subsystems of the vehicle 12, as will be described in the proceeding figures. In this way, the detection system 10 may be employed in tandem or in conjunction with other operational parameters for the vehicle 12. For example, the detection system 10 may be configured for communicating notifications to the occupants 26 of alert conditions, controlling the various operational parameters in response to actions detected in the interior 18, activating or deactivating various subsystems of the vehicle 12, or interacting with any vehicle systems to effectuate operational adjustments.

Figure 4:
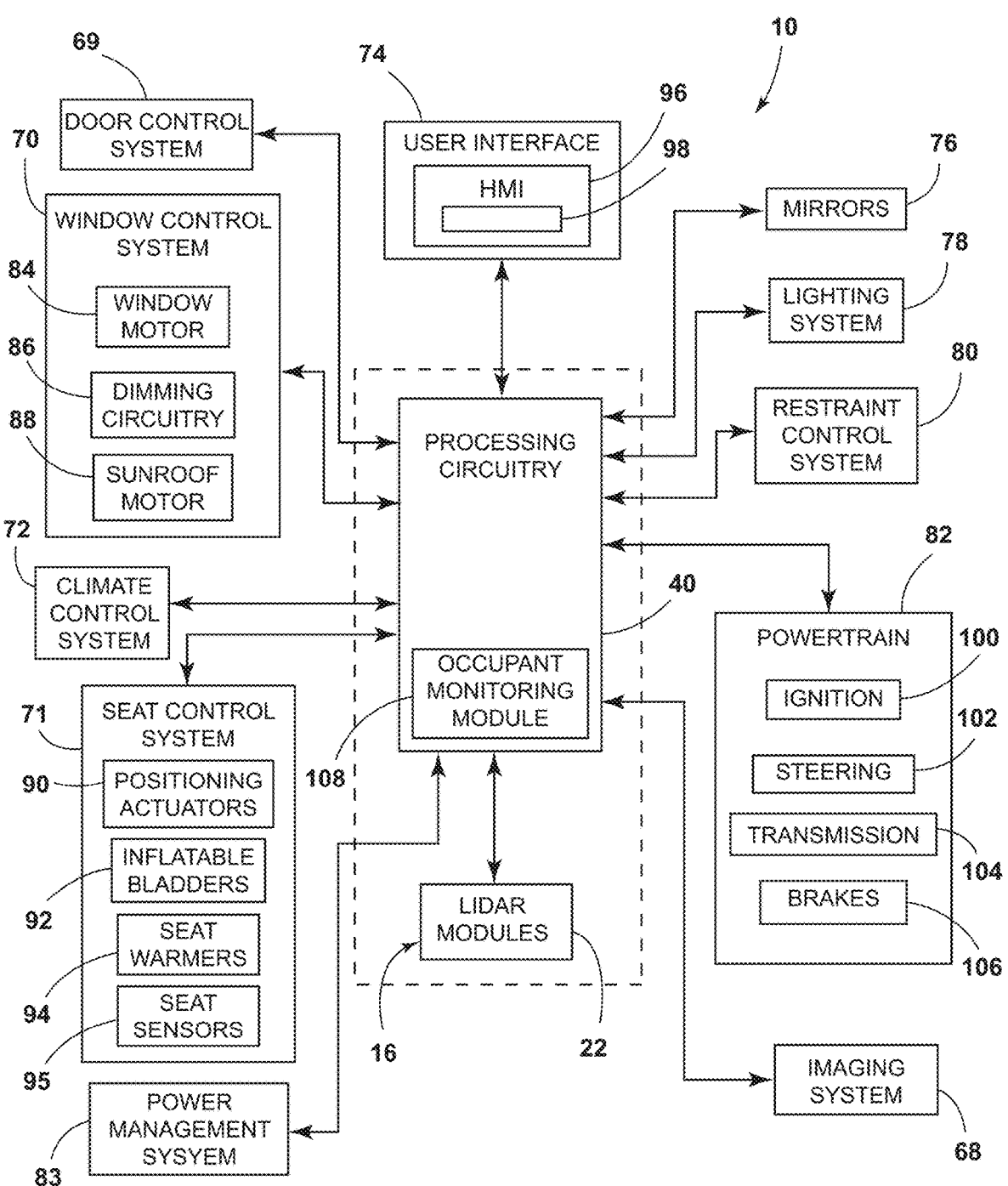
FIG. 4 is a block diagram of an exemplary detection system for a vehicle.

Referring now to FIG. 4, the detection system 10 may incorporate or be in communication with various systems of the vehicle 12 (e.g., vehicle systems). For example, the processing circuitry 40 may be configured to communicate with an imaging system 68 that includes imaging devices, such as cameras (e.g., red-, green-, and blue-pixel (RGB) or IR cameras). The processing circuitry 40 may further be in communication with other vehicle systems, such as a door control system 69, a window control system 70, a seat control system 71, a climate control system 72, a user interface 74, mirrors 76, a lighting system 78, a restraint control system 80, a powertrain 82, a power management system 83, or any other vehicle systems. Communication with the various vehicle systems may allow the processing circuitry 40 to transmit and receive signals or instructions to the various vehicle systems based on processing of the at least one point cloud 24 captured by the time-of-flight sensors 16. For example, when the processing circuitry 40 identifies a number of occupants 26 in the vehicle 12 based on the at least one point cloud 24, the processing circuitry 40 may communicate an instruction to adjust the seat control system 71 and/or the climate control system 72. Such operations should always be implemented in accordance with the owner manual and safety guidelines. In another non-limiting example, the processing circuitry 40 may receive information or signals from the lighting system 78 and control operation of the time-of-flight sensors 16 based on the information from the lighting system 78. Accordingly, the processing circuitry 40 may control, or communicate instructions to control, the time-of-flight sensors 16 based on information from the vehicle systems and/or may communicate signals or instructions to the various vehicle systems based on information received from the time-of-flight sensors 16.

The window control system 70 may include a window motor 84 for controlling a position of a window of the vehicle 12. Further, the window control system 70 may include dimming circuitry 86 for controlling an opacity and/or level of light transmitted between the interior 18 of the vehicle 12 and the region exterior 20 to the vehicle 12. One or more sunroof motors 88 may be provided with the window control system 70 for controlling closing and opening of a sunroof panel. It is contemplated that other devices may be included in the window control system 70, such as window locks, window breakage detection sensors, and other features related to operation of the windows of the vehicle 12. By providing communication between the window control system 70 and processing circuitry 40 of the present disclosure, the window control system 70 may be configured to adjust one or more of its features based on conditions determined or detected by the processing circuitry 40 based on the at least one point cloud 24. Similarly, the window control system 70 may transmit one or more signals to the processing circuitry 40, and the processing circuitry 40 may control operation of the time-of-flight sensors 16 based on the signals from the window control system 70.

The climate control system 72 may include one or more heating and cooling devices, as well as vents configured to distribute heated or cooled air into the interior 18 of the vehicle 12. Although not specifically enumerated in FIG. 4, the climate control system 72 may be configured to actuate a vent to selectively limit and allow heated air or cooled air to circulate in the interior 18 of the vehicle 12. Further, the climate control system 72 may be configured to operate heating, ventilation, and air conditioning (HVAC) systems to recirculate air or to vent air to the region exterior 20 to the vehicle 12.

The seat control system 71 may include various positioning actuators 90, inflatable bladders 92, seat warmers 94, and/or other ergonomic and/or comfort features for seats 34 in the vehicle 12. For example, the seat control system 71 may include motors configured to actuate the seat 34 forward, backward, side to side, or rotationally. Both a backrest of the seat 34 and a lower portion of the seat 34 may be configured to be adjusted by the positioning actuators 90. Such operations should always be implemented in accordance with the owner manual and safety guidelines. The inflatable bladders 92 may be provided within the seat 34 to adjust a firmness or softness of the seat 34, and seat warmers 94 may be provided for warming cushions in the seat 34 for comfort of the occupants 26. In one non-limiting example, the processing circuitry 40 may compare the position of the seats 34 based on seat sensors 95, such as position sensors, occupancy detection sensors, or other sensors configured to monitor the seats 34, to the point cloud data captured by the time-of-flight sensors 16 in order to verify or check an estimated seat position based on the point cloud data. Such operations should always be implemented in accordance with the owner manual and safety guidelines. In other examples, the processing circuitry 40 may communicate one or more signals to the seat control system 71 based on body pose data identified in the at least one point cloud 24. In yet further examples, the processing circuitry 40 may be configured to adjust an operational parameter of the time-of-flight sensors 16, such as a scanning direction, a frequency of the LiDAR module 22, or the like, based on the position of the seats 34 being monitored by the time-of-flight sensors 16.

The user interface 74 may include a human-machine interface (HMI) 96 and/or may include audio devices, such as microphones and/or speakers, mechanical actuators, such as knobs, buttons, switches, and/or a touchscreen 98 incorporated with the HMI 96. The human-machine interface 96 may be configured to present various digital objects representing buttons for selection by the user via, for example, the touchscreen 98. In general, the user interface 74 may communicate with the processing circuitry 40 to activate or deactivate the time-of-flight sensors 16, adjust operational parameters of the time-of-flight sensors 16, or control other aspects of the time-of-flight sensors 16. Similarly, the processing circuitry 40 may be configured to communicate instructions to the user interface 74 to present information and/or other data related to the detection and/or processing of the at least one point cloud 24 based on the time-of-flight sensors 16. It is further contemplated that the mobile device 35 may incorporate a user interface 74 to present similar options to the user at the mobile device 35.

Still referring to FIG. 4, other vehicle systems include the mirrors 76, the lighting system 78, and the restraint control system 80. These other vehicle systems may also be adjusted based on the at least one point cloud 24 generated by the time-of-flight sensors 16 and processed by the processing circuitry 40. Additionally, subcomponents of these systems (e.g., sensors, processors) may be configured to send instructions or data to the processing circuitry 40 to cause the processing circuitry 40 to operate the time-of-flight sensors 16 in an adjusted operation. For example, the processing circuitry 40 may be configured to deactivate the time-of-flight sensors 16 in response to the lighting system 78 detecting adequate lighting to allow for visible light and/or IR occupant monitoring. In some examples, the processing circuitry 40 may communicate an instruction to adjust a position of the mirrors 76 based on the at least one point cloud 24. For example, the at least one point cloud 24 may demonstrate an event, such as an orientation of a driver, a position of another vehicle in the region exterior 20 to the vehicle 12, or any other positional feature, and generate a signal to the mirrors 76 (or associated positioning members) to move the mirrors 76 to align a view with the event.

Referring again to FIG. 4, the vehicle 12 may include the powertrain 82 that incorporates an ignition system 100, a steering system 102, a transmission system 104, a brake system 106, and/or any other system configured to drive the motion of the vehicle 12. In some examples, the at least one point cloud 24 captured by the time-of-flight sensors 16 may be processed by the processing circuitry 40 to determine target steering angles, rates of motion or speed changes, or other vehicle operations for the powertrain 82, and communicate the target operations to the powertrain 82 to allow for at least partially autonomous control over the motion of the vehicle 12. Such at least partially autonomous control may include fully autonomous operation or semiautonomous operation of the vehicle 12. For example, the processing circuitry 40 may communicate signals to adjust the brake system 106, the ignition system 100, the transmission system 104, or another system of the powertrain 82 to stop the vehicle 12 or move the vehicle 12.

The processing circuitry 40 may further include an occupant monitoring module 108 that may communicate with any of the vehicle systems described above, as well as the time-of-flight sensors 16 of the present disclosure. The occupant monitoring module 108 may be configured to store various algorithms for detecting aspects related to the occupants 26. For example, the algorithms may be executed to monitor the interior 18 of the vehicle 12 to identify occupants 26 in the vehicle 12, a number of occupants 26, or other occupancy features of the interior 18 using the point cloud data and/or video or image data captured by the imaging system 68. Similarly, various seat sensors 95 of the seat control system 71, heating or cooling sensors that detect manual manipulation of the vents for heating or cooling control for the climate control system 72, inputs to the window control system 70, or any other sensor of the vehicle systems previously described may be processed in the occupant monitoring module 108 to detect positions of occupants 26 in the vehicle 12, conditions of occupants 26 in the vehicle 12, states of occupants 26 in the vehicle 12, or any other relevant occupancy features that will be described herein. The processing circuitry 40 may also include various classification algorithms for classifying objects detected in the interior 18, such as for the cargo 37, mobile devices 35, animals, and any other living or nonliving item in the interior 18. Accordingly, the processing circuitry 40 may be configured to identify an event in the interior 18 or predict an event based on monitoring of the interior 18 by utilizing information from the other vehicle systems.

In general, the detection system 10 may provide for spatial mapping of the environment 14 of the vehicle 12. For example, the LiDAR modules 22 may detect the position, in three-dimensional space, of objects, items, or other features in the interior 18 or the region exterior 20 to the vehicle 12. Such positions, therefore, include depth information of the scene captured by the LiDAR module 22. As compared to a two-dimensional image captured by a camera, the at least one point cloud 24 generated by the time-of-flight sensor 16 allows for more efficient determination of how far the features are from the LiDAR module 22 and from one another. Thus, complex image analysis techniques involving pixel analysis, comparisons of RGB values, or other techniques to estimate depth may be omitted due to utilization of the ToF sensors 16. Further, while multiple imaging devices from different angles of a common scene (e.g., a stereoscopic imager) may allow for more accurate estimation of depth information than those produced by a single camera, complex data processing techniques may be required for multiple cameras to be employed to gather the depth information. Further, such multi-camera systems may require additional weight, packaging volume, or other inefficiencies relative to the time-of-flight sensors 16 of the present disclosure.

Accordingly, the detection system 10 may be computationally-efficient and/or power-efficient relative to two-dimensional and three-dimensional cameras for determining positional information. Further, other time-of-flight sensing techniques, such as RADAR, while providing depth information, may present certification issues based on RF requirements and may be less accurate than the present LiDAR modules 22. Further, a number of cameras used for monitoring the environment 14 may be reduced, various presence detectors (vehicle seat sensors 95) may be omitted, and other sensors configured to determine positional information about the environment 14 may be omitted due to the precision of the LiDAR. Thus, a solution may be provided by the detection system 10 by reducing the number of sensors required to monitor various aspects of the environment 14.

Referring now to FIGS. 5-9, the detection system 10 may be a system for managing adjustments for a component of the vehicle 12. The detection system 10 may include the time-of-flight sensor 16 configured to generate the at least one point cloud 24 representing the compartment 28 of the vehicle 12. The at least one point cloud 24 may include three-dimensional positional information about the compartment 28. At least one actuator 120 is configured to adjust the component of the vehicle 12. The processing circuitry 40 is in communication with the time-of-flight sensor 16 and the at least one actuator 120. The processing circuitry 40 is configured to detect the occupant 26 in the seat 34 of the vehicle 12 based on the at least one point cloud 24. The processing circuitry 40 is further configured to define a first portion 122 of the at least one point cloud 24 corresponding to the occupant 26, and a second portion 124 corresponding to the seat 34 of the vehicle 12. The processing circuitry 40 is further configured to calculate a volume V of the occupant 26 based on the first portion 122 of the at least one point cloud 24. The processing circuitry 40 is further configured to estimate a bodyweight of the occupant 26 based on the volume V. The processing circuitry 40 is further configured to communicate an instruction to adjust the component of the vehicle 12 in response to the estimation of the bodyweight.

According to some examples, the processing circuitry 40 is further configured to calculate a product of the volume V of the occupant 26 and a density estimate ρ. The estimation of the bodyweight is based on the product of the volume V of the occupant 26 and the density estimate ρ. For example, the density estimate ρ may be an average density for a human body. In some examples, the density estimate ρ is between 900 and a 1000 kg/m³ per meters cubed. In a preferred example, the density estimate ρ is approximately 985 kg/m³. By multiplying the density estimate ρ by the volume V of the occupant 26, the mass of the occupant 26, and therefore the bodyweight, may be determined by the processing circuitry 40.

According to some examples, the detection system 10 may include databases 126, 128 that are in communication with the processing circuitry 40. The databases 126, 128 include skeleton model data. The processing circuitry 40 is configured to define a skeleton model 130 for the occupant 26 based on the at least one point cloud 24 and based on the skeleton model data. For example, while the three-dimensional positional information may reveal the volume V of the occupant 26, the estimation of the volume V may be further refined by applying skeleton model data stored in the skeleton model database 126. For example, the processing circuitry 40 may further be configured to determine a pose of the occupant 26 based on the first portion 122 of the at least one point cloud 24 and the skeleton model 130. The skeleton model 130 may include keypoints 132a-z corresponding to a central axis 134 of body segments of the occupant 26. The processing circuitry 40 may be configured to compare the keypoints 132a-z to the first portion 122 of the at least one point cloud 24, calculate a part $v_{seg}$ of the volume V for each body segment based on the comparison of the keypoints 132a-z to the first portion 122, and calculate a sum of the parts $v_{seg}$ of the volume V to determine the volume V of the occupant 26. For example, the processing circuitry 40 may identify a head 140, a torso 142, arms 144, legs 146, joints 148, or any subparts thereof, based on the first portion 122 of the at least one point cloud 24 and calculate the part $v_{seg}$ of the volume V corresponding to the particular body segment. Based on an estimation of the central axis 134 for each body segment, the processing circuitry 40 may estimate the part $v_{seg}$ of the volume V corresponding to the body segment and add up, or sum, the parts of the volume v to determine the volume for the occupant 26. In this way, the LiDAR modules 22 of the present disclosure may be employed to more accurately estimate the volume V, in combination with application of the skeleton model 130 for the occupant 26.

According to some examples, the processing circuitry 40 is further configured to compare the first portion 122 of the at least one point cloud 24 to the second portion 124 of the at least one point cloud 24 and estimate a coronal plane 150 for the occupant 26 based on the comparison of the first portion 122 to the second portion 124. The keypoints 132a-z may correspond to the coronal plane 150 of the occupant 26, in some examples. The calculation of the volume V may be based further on the keypoints 132a-z of the coronal plane 150. For example, estimation of the coronal plane 150 may be based on the processing circuitry 40 being configured to detect a first depth 152 of a front 154 of the occupant 26 based on the first portion 122, detect a second depth 156 of a seating surface 158 of the seat 34 based on the second portion 124, and calculate an average depth 160 based on the first and second depths 152, 156. For example, if a chest 162 of the occupant 26 is detected having a first depth 152, or vehicle-forward coordinate, and the seating surface 158 of, for example, a backrest of the seat 34, has a depth in a vehicle-forward dimension, the two depths may be compared to one another to determine a difference. In this way, the front 154 of the occupant 26 and the seating surface 158 may each be determined, and a point halfway between the seating surface 158 and the chest 162 may be estimated by the processing circuitry 40. The point halfway between the first and second depths 152, 156 may correspond to the coronal plane 150 of the occupant 26 or another medial position corresponding to the central axis 134 of one or more of the body segments, as previously described. Thus, in general, the depth information of the surroundings of the occupant 26 compared to the depth information of the occupant 26 may be utilized with the present detection system 10 to estimate the central axis 134 of each body segment to allow for more accurate estimations of the volume V of the occupant 26.

According to some examples, the processing circuitry 40 is further configured to define a third portion 164 of the at least one point cloud 24 corresponding to a structural surface 166 of the compartment 28. The processing circuitry 40 is further configured to compare the first portion 122 of the at least one point cloud 24 to the third portion 164 of the at least one point cloud 24 and adjust an activation of at least one component based on a comparison of the first portion 122 to the third portion 164. For example, the processing circuitry 40 may be configured to determine an alignment vector 168 between the first portion 122 of the third portion 164 of the at least one point cloud 24. The adjustment of the activation may be based further on the alignment vector 168. For example, a projected motion of the occupant 26 in response to movement of the vehicle 12 may correspond to the alignment vector 168, and the processing circuitry 40 may adjust activation of the at least one component to be between the first portion 122 and the third portion 164 of the at least one point cloud 24. In some examples, the at least one adjustable component includes at least one restraint 170, 172 configured to align with the alignment vector 168 upon deployment 173 of the at least one restraint 170, 172. For example, the projected motion of the occupant 26 may be impeded or interposed by the at least one restraint 170, 172 in response to the vehicle 12 moving.

According to some examples, the adjustment of the activation includes adjusting a timing of the deployment 173 based on the comparison of the first portion 122 and the second portion 124. For example, the bodyweight of the occupant 26 may be utilized by the detection system 10 to adjust the deployment 173, including a inflation pressure, a deflation pressure, a delay, an advance, or any other parameter related to the deployment 173 of the at least one restraint 170, 172. For example, the bodyweight of the occupant 26 may influence a rate of motion, a moment of inertia, a proclivity to the potential motion for the alignment vector 168, or any other kinematic response to movement of the vehicle 12. Further, the position of the seat 34 may influence activation or deactivation of the at least one restraint 170, 172.

According to some examples, the at least one actuator 120 is configured to adjust the seat 34. Such operations should always be implemented in accordance with the owner manual and safety guidelines. For example, upon detection of a particular bodyweight for the occupant 26, the processing circuitry 40 may communicate an instruction to adjust the seat 34 to a target position corresponding to a target posture or comfort level for the occupant 26 corresponding to the bodyweight estimated by the detection system 10. Such operations should always be implemented in accordance with the owner manual and safety guidelines. In some examples, adjustment to the seat 34 and the at least one restraint 170, 172 may be performed by the detection system 10 in parallel or in tandem with one another. For example, adjustment to the position of the occupant 26 based on the bodyweight may result in adjustment to the at least one restraint 170, 172 based on movement of the occupant 26 following adjustment to the seat 34. Such operations should always be implemented in accordance with the owner manual and safety guidelines. Thus, the present LiDAR modules 22 may be employed to gather the precise three-dimensional positional information to allow for an adjustment to other vehicle systems in communication with the processing circuitry 40 to allow for effective activation of the restraint control system 80 or another vehicle system.

Figure 5:
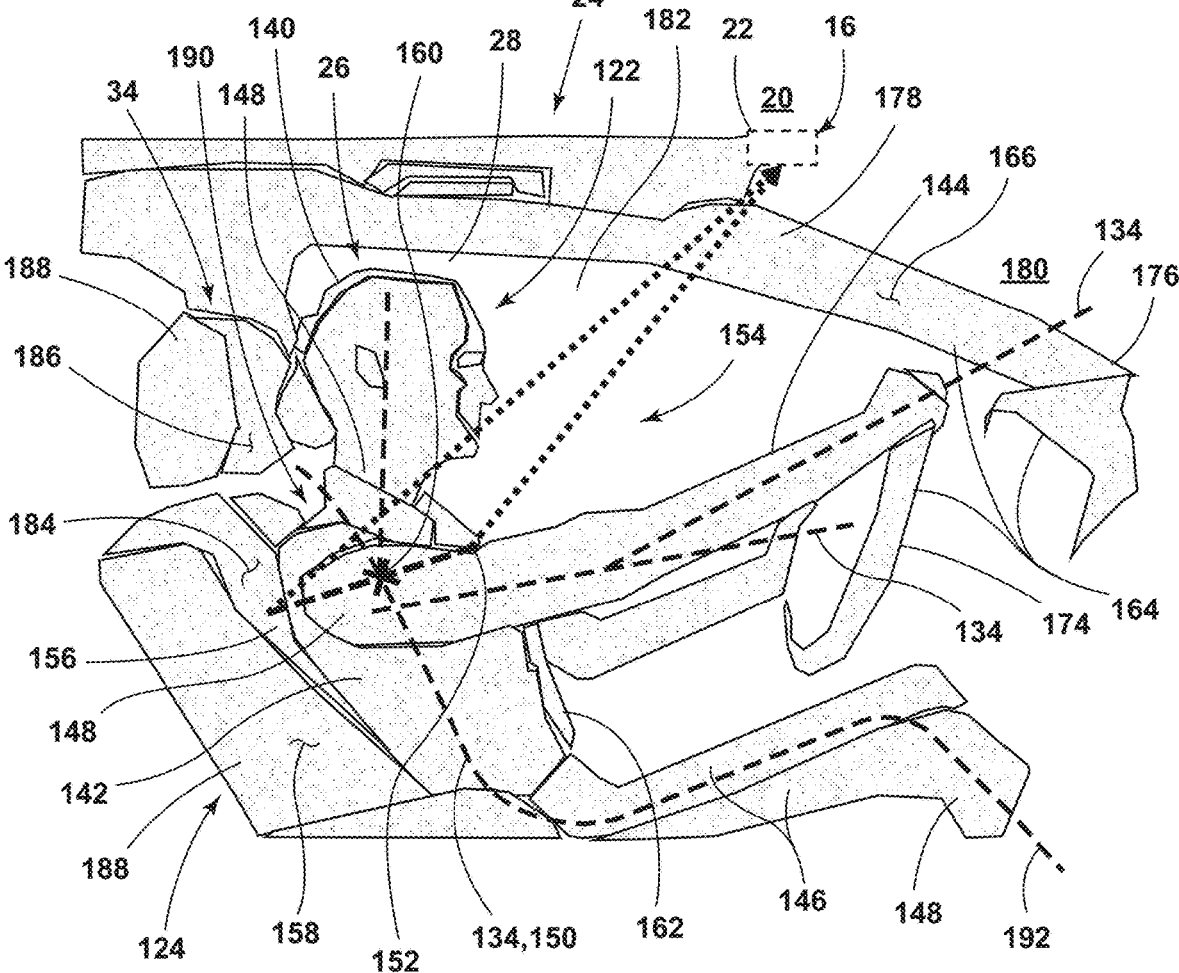
FIG. 5 is a side view of an exemplary point cloud generated by one or more LiDAR modules demonstrating depth estimation and calculation of a central point for an occupant of a vehicle according to one aspect of the present disclosure.

Referring now more particularly to FIG. 5, an exemplary demonstration of estimation of the average depth 160 of the occupant 26, and in particular, the torso 142 of the occupant 26 is generally illustrated. As previously described, the processing circuitry 40 may define the first portion 122 of the at least one point cloud 24 corresponding to the occupant 26, the second portion 124 of the at least one point cloud 24 corresponding to the seat 34, and the third portion 164 of the at least one point cloud 24 corresponding to structural surfaces 166 in the passenger cabin 32. For example, the structural surfaces 166 may include a steering wheel 174, a dashboard 176, a headliner 178, a windshield 180, a window 182, or any other component in the passenger cabin 32 that may be able to be contacted by the occupant 26. The second portion 124 of the at least one point cloud 24 may be representative of the seating surface 158 of the seat 34, such as a backrest surface 184, an upper part surface 186, a lower portion of the seat 34, or any other seating surface 158. By measuring the depth of the chest 162 relative to the depth of the seating surface 158, the central axis 134 of the torso 142, as well as at least some of the other body segments of the occupant 26, may be estimated by the processing circuitry 40.

Referring now more particularly to FIG. 5, the processing circuitry 40 may be configured to estimate other dimensions or proportions of the body segments of the occupant 26 based on an amount of contact with a cushion 188 of the seat 34 compared to an estimated length of the body segment. For example, a contact length may be compared to lengths of the cushion 188, and either or both of the contact length of the lengths of the cushion 188 may be compared to a length of the torso 142 or any other body segment. Based on the relationship of the various lengths compared to known historical data corresponding to the occupant 26 or corresponding to occupants 26 having similar builds, including body shape, bodyweight, height, or another dimensional parameter, the processing circuitry 40 may generate a more accurate estimate for the bodyweight of the occupant 26. Thus, in addition to estimation of central points for the occupant 26 (e.g., the coronal plane 150, the keypoints 132*a-z*), the present at least one point cloud 24 generated by the LiDAR modules 22 may allow for greater precision in estimating bodyweight by using predefined proportions of the lengths of the various body segments compared to the amount or contact length for the body segment with the cushion 188. For example, if approximately 80% of a back of the occupant 26 is typically engaging or abutting the seating surface 158 of the backrest surface 184, the processing circuitry 40 may estimate the height of the torso 142 based on determining where the back is not contacting the seating surface 158 according to the dimensional data. For example, a space region 190 may be defined by the processing circuitry 40 corresponding to space between the occupant's 26 back and the cushion 188 of the seat 34. Based on the contact length, the processing circuitry 40 may determine the length of the torso 142 which may be utilized for estimation of the volume V of the torso 142 and thus the volume V of the occupant 26.

Still referring to FIG. 5, the average depth 160 estimated between the first depth 152 and the second depth 156 may correspond to the location of the coronal plane 150 for the occupant 26 and/or a contour 192 for the occupant 26 that corresponds to the overall pose of the occupant 26 associated with a frontal view of the occupant 26. For example, while a frontal area of the occupant 26 from a front-facing camera may allow for estimations of the volume V of the occupant 26 based on predefined relationships using, for example, the seat position sensor 95 of the seat 34 to detect how far away the occupant 26 is from the camera and compare the area of the front 154 of the occupant 26 to the known depth of the seat 34, the present detection system 10 may employ LiDAR to more accurately determine the depth of the occupant 26 to determine the volume V of the occupant 26. For example, because the points 36 of the at least one point cloud 24 may include rectilinear coordinate information, a direct comparison of the points 36 associated with the seating surface 158 may be compared to the points 36 corresponding to the position of the occupant 26. The occupant's 26 clothes, the occupant's 26 skin, face, or any other part of the occupant 26. As previously described, the estimate may be further refined by determining the keypoints 132*a-z* of the skeleton model 130 to therefore estimate the center or middle of each body segment. This estimation may include the pose of the occupant 26, which may include information pertaining to the contour 192 of the occupant 26. Therefore, as demonstrated in FIG. 5, an average centerline passing through the occupant 26 along the head 140, torso 142, and one or both legs 146 may aid in generating the contour 192 to provide a more accurate estimation of the volume V.

It is contemplated that the contour 192 described herein may correspond to the coronal plane 150 of the occupant 26 when the occupant 26 is in a position other than an upright standing pose. Accordingly, the coronal plane 150 may correspond to the central part of the occupant 26 throughout each body segment and intersect with the central axis 134 for each body segment. However, it is contemplated that the present detection system 10 may incorporate estimation of any other biometric plane, such as the transverse plane or the sagittal plane, in order to provide an accurate estimation for the keypoints 132*a-z* of the skeleton model 130.

Figure 6:
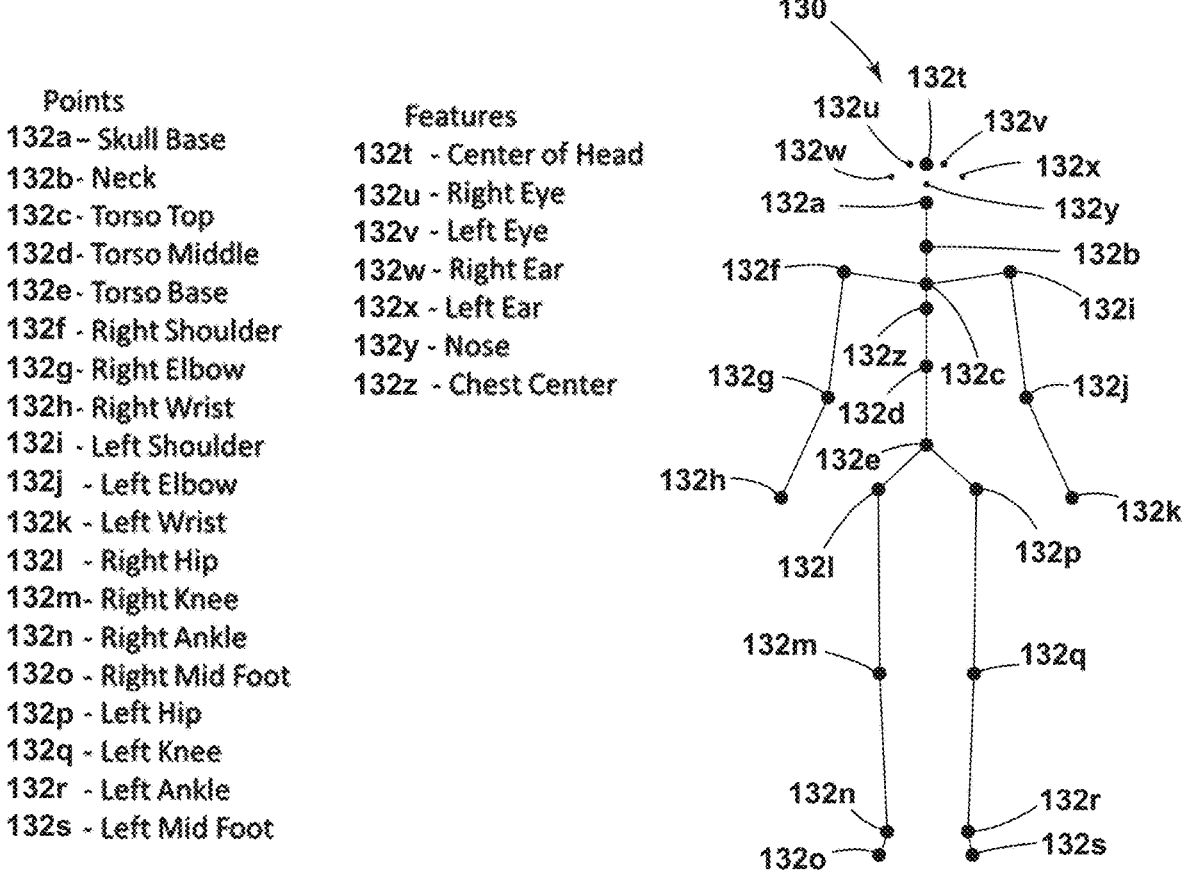
FIG. 6 is an exemplary skeleton model having keypoints corresponding to joints and body segments for an occupant of the vehicle.

Referring now to FIGS. 5 and 6, the skeleton model 130 employed by the present detection system 10 may be configured with estimations for various body segments, including the body parts shown and described in FIG. 6. The particular proportions, or spacing, between the keypoints 132*a-z*, may vary depending on the size or shape of the occupant 26. Accordingly, the processing circuitry 40 may be configured to select a correlating skeleton model 130 for the occupant 26 based on the dimensional information generated or captured by the at least one point cloud 24.

Figure 7:
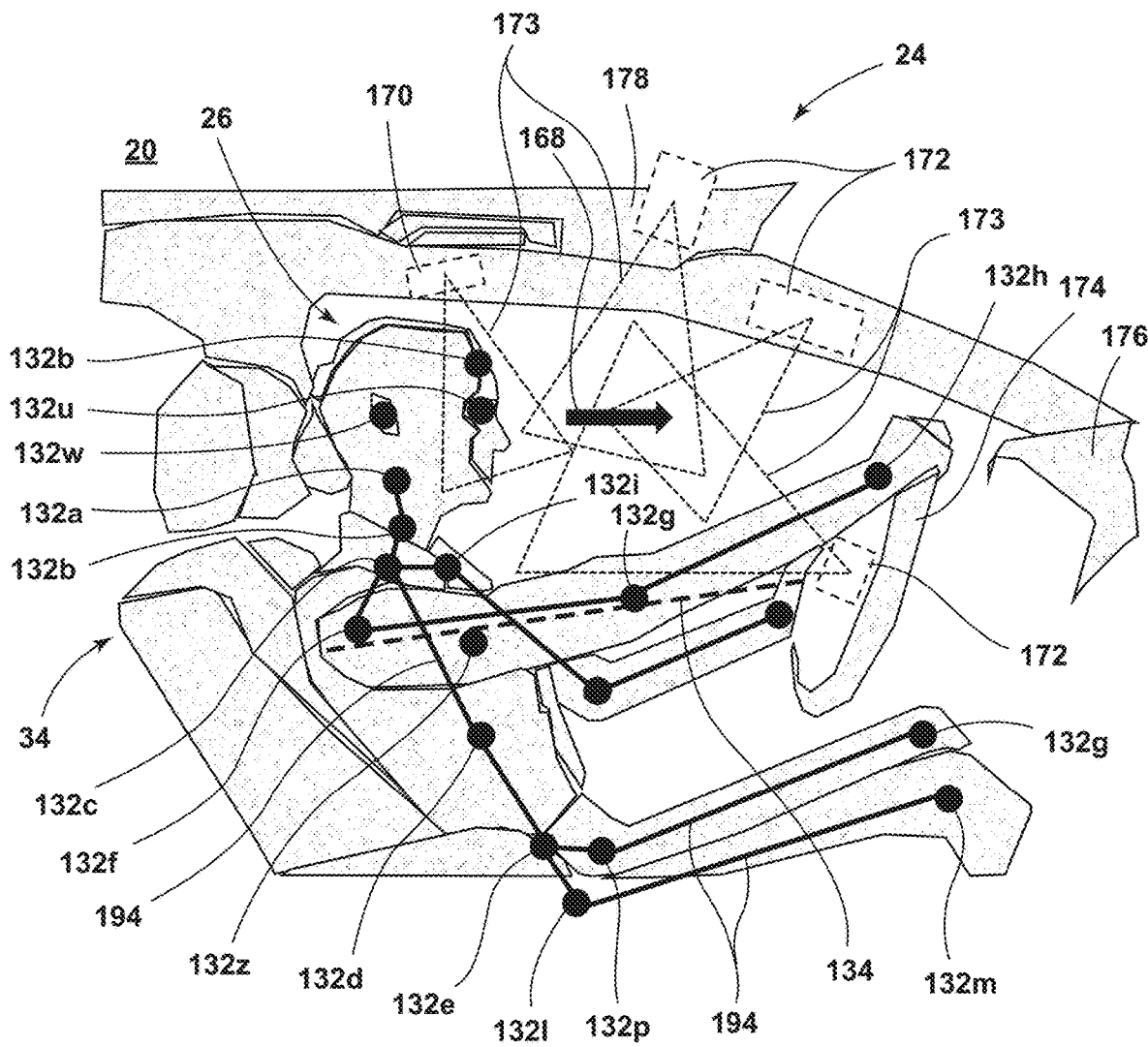
FIG. 7 is the exemplary point cloud illustrated in FIG. 5. having a skeleton model corresponding to the point cloud overlaid over the point cloud and demonstrating deployments for at least one restraint.

Referring more particularly to FIG. 7, the at least one point cloud 24 illustrated in FIG. 5 has the selected skeleton model 130 overlaid over the first portion 122 of the at least one point cloud 24. As shown, the keypoints 132*a-z* may generally align with the central axis 134 for the body segments previously shown with respect to FIG. 5. In some examples, the central axis 134 for each body segment as estimated based on the at least one point cloud 24 may be adjusted or modified in response to selection of the estimated skeleton model 130 for the occupant 26. Thus, by providing the skeleton model 130 along with the at least one point cloud 24 generated by the LiDAR modules 22, the present detection system 10 may provide for a more accurate estimation of body proportions and, accordingly, a better estimation of bodyweight, height, and/or other biometric features. For example, body segments between the keypoints 132a-z may have orientations that may be misaligned with the estimated central axis 134 for each of the body segments as demonstrated by the offset of the skeleton model 130 to the central axis 134 of the right upper-arm of the occupant 26. Further, the body segments may have lengths between keypoints 132a-z that may differ from the lengths between joints 148 as estimated based on the central axis 134 for each body segment based on the at least one point cloud 24 alone.

Still referring to FIG. 7, the restraint control system 80 previously described may include the one or more of the restraints 170, 172, such as at least one first restraint 170 and at least one second restraint 172. Each of the restraints 170, 172 may have a deployment 173 that may correspond to an inflation of the restraint 170, 172 for blocking or impeding the alignment vector 168 between the first portion 122 of the at least one point cloud 24 and the third portion 164 of the at least one point cloud 24. For example, a potential motion for the occupant 26 forward in response to moving the vehicle forward may result in the alignment vector 168 extending from the occupant 26 toward the structural surfaces 166 of the compartment 28. Based on the position, bodyweight, or other biometric value as estimated by the processing circuitry 40, the one or more restraints 170, 172 may be adjusted to be activated or deactivated, or a timing may be adjusted to align with the alignment vector 168. Accordingly, by employing the at least one point clouds 24 and skeleton model 130 of the occupant 26, deployment 173 of the one or more restraints 170, 172 may be enhanced.

For example, the at least one first restraint 170 may be deactivated, and/or a timing of the at least one restraint 170, 172 may be modified based on the position of the occupant 26 as detected by the LiDAR modules 22. As shown, deployment 173 of the at least one first restraint 170 may not be aligned with the alignment vector 168 and therefore may be deactivated and/or a timing of the at least one first restraint 170 may be adjusted. Further, the processing circuitry 40 may be in communication with the seat control system 71 as previously described, and the processing circuitry 40 may communicate an instruction to adjust the timing or deactivate the at least one first restraint 170 based on the position of the seat 34. Such operations should always be implemented in accordance with the owner manual and safety guidelines.

In general, the present detection system 10 may allow for identification of seating arrangements in the vehicle 12, classification of occupancy within the seats 34, identification of available seats 34, and recommendation of optimal arrangement and/or deployment of the restraints 170, 172. Such classifications may result in optimal deployment 173 of restraint control system 80 or management of the restraint control system 80. Further, the present detection system 10 may replace or allow for independent operation of the detection system 10 without dependency on position sensors in the other vehicle systems (e.g., the seat position sensor 95, a position sensor for the steering wheel 174, etc.). The detection system 10 may provide for such enhancements by collecting the first, second, and third portions 122, 124, 164 of the at least one point cloud 24 and classifying the portions 122, 124, 164 as such. By classifying the at least one point cloud 24 into these portions 122, 124, 164, transient coordinates of the keypoints 132a-z of the occupant 26 may be actively tracked and compared to potential contact points of the third portion 164 and second portions 124 of the at least one point cloud 24 (e.g., the seats 34 and the structural surfaces 166).

In some examples, to optimize computational power and energy consumption, the processing circuitry 40 may be in communication with the door control system 69 as previously described. The door control system 69 may include a sensor 196 configured to detect an open or closed status of a door 195, which may be used to wake up or initiate the methods performed by the present detection system 10. For example, upon the door 195 being detected as ajar, the detection system 10 may activate to focus the LiDAR modules 22 on each seat 34 in the vehicle 12 or a specific seat 34 in the vehicle 12 (e.g., a seat 34 of the driver). The point cloud data may then be captured by the detection system 10 to gather the depth information utilized for detecting the bodyweight, height, or other physical features of the occupants 26 for classification and for control of the vehicle systems in response to the height, weight, or other biometric properties of the occupant 26. For example, after an initial stage of gathering dimensional data, the detection system 10 may, based on height, estimated bodyweight, or the like, communicate an instruction to the seat control system 71 to adjust one or more of the seats 34 in the vehicle 12 to a make more comfortable, ergonomic, or functional the practical arrangement (e.g., a baby on board event). In this way, the present detection system 10 may be utilized for optimizing the seating arrangement in the vehicle 12 based on the at least one point cloud 24. Such operations should always be implemented in accordance with the owner manual and safety guidelines.

Figure 8:
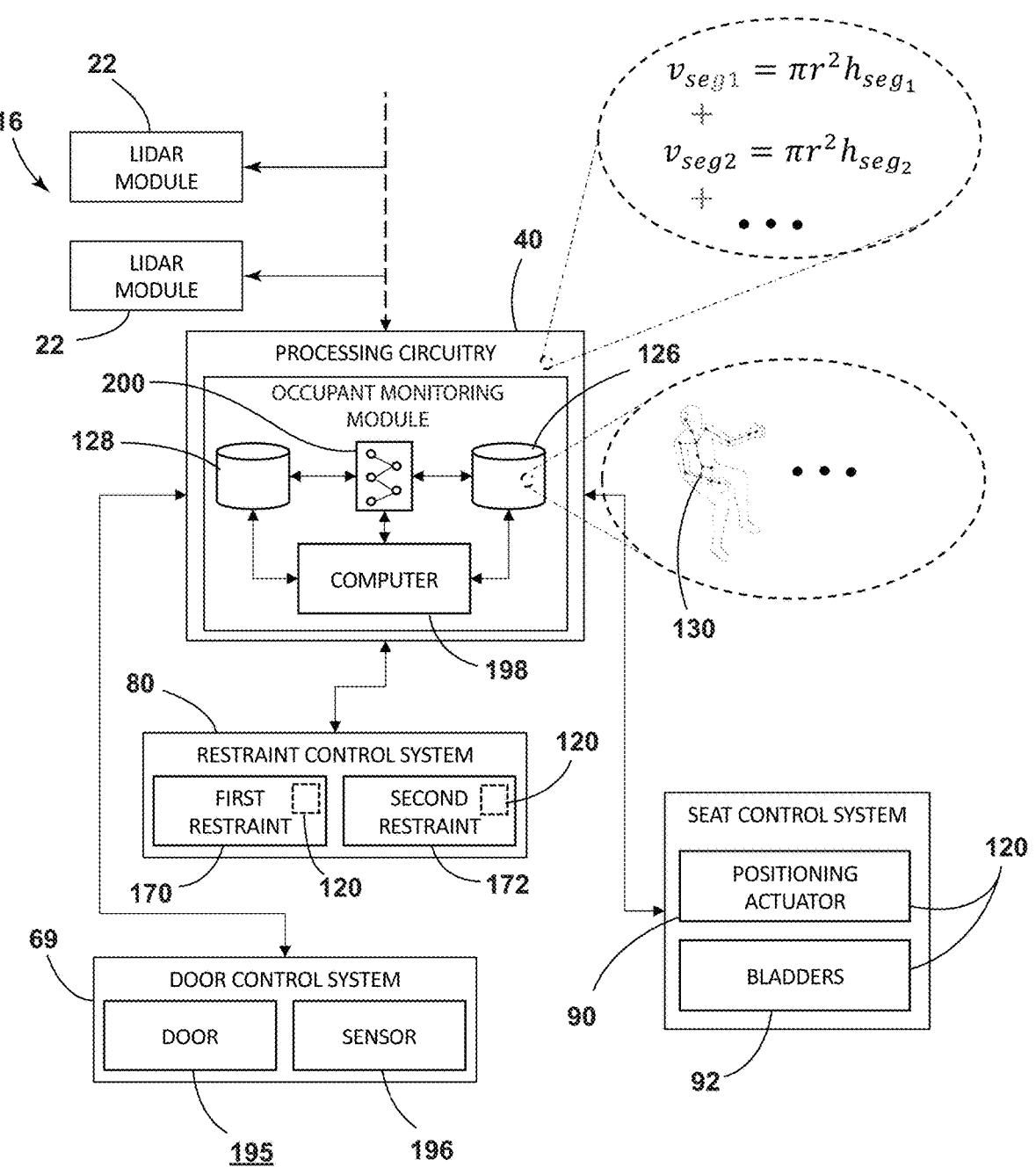
FIG. 8 is a block diagram of an exemplary detection system for a vehicle.

Referring now to FIG. 8, the processing circuitry 40 may include or be in communication with the occupant monitoring module 108 as previously described. The occupant monitoring module 108 may include a body pose database 128 that stores body pose data and a skeleton model database 126 that stores the skeleton model data. The skeleton model database 126 may include one or more of the skeleton models 130 corresponding to various body shapes, heights, weights, ages, physical abilities, and any other state of the body of the occupant 26. It is contemplated that the skeleton model database 126 and the body pose database 128 may be formed into a common database 67. In general, the body pose database 128 and the skeleton model database 126 may be configured to store three-dimensional coordinate information corresponding to body parts related to joints 148 and/or other body segments of a human body and/or an animal body. For example, the skeleton model 130 may have a plurality of keypoints 132a-z corresponding to the poses of occupants 26 of the vehicle 12. Such keypoints 132a-z may be correlated to one another in a common skeleton model 130 by a computer 198 of the occupant monitoring module 108 that may employ a similarity measurement algorithm based on the keypoints 132a-z and various distances between the keypoints 132a-z. An example of a system for generating three-dimensional reference points based on similarity measures of reference points is described in U.S. Patent Application Publication No. 2022/0256123, entitled "Enhanced Sensor Operation," the entire disclosure of which is herein incorporated by reference.

Still referring to FIG. 8, the occupant monitoring module 108 may include one or more of the neural networks 200 previously described, which may be in communication with the body pose database 128, the skeleton model database 126, and the computer 198. It is further contemplated that the skeleton model database 126 and the body pose database 128 may include one or more target point clouds corresponding to keypoint 132*a-z* information that relates to target body pose data. Thus, the at least one point cloud 24 generated by one or more of the LiDAR modules 22 may be processed in the processing circuitry 40 and or in the occupant monitoring module 108. The processing circuitry 40 may compare the at least one point cloud 24 to the target point cloud stored in the occupant monitoring module 108 to estimate a pose of the occupant 26 in the vehicle 12 and/or perform various functions related to occupant classification. For example, the at least one point cloud 24 captured by the LiDAR modules 22 may be processed in the occupant monitoring module 108 to determine the keypoints 132*a-z* of the occupant 26 and the at least one point cloud 24. The keypoints 132*a-z* may be determined based on an output of the computer 198, which may employ the neural networks 200 that are trained to generate the keypoints 132*a-z*. For example, the neural networks 200 may be trained on up to hundreds, thousands, or millions of target point clouds representing occupants 26 in various body poses. For example, the computer 198 may implement various machine learning models 66 that are trained to detect or generate the skeleton model 130 based on an identified body pose. Following assembling of the keypoints 132*a-z* for the occupant 26 captured in the at least one point cloud 24, the processing circuitry 40 may compare the body pose to body pose data stored in the body pose database 128 to determine the length and/or angles of the segments interposing the keypoints 132*a-z* in the skeleton model 130.

The processing circuitry 40 may further be in communication with the door control system 69, as previously described. Upon detection of one or more of the doors 195 of the vehicle 12 being opened or closed, the sensor 196 may activate and a signal may be communicated to the processing circuitry 40 to indicate that the door 195 is open. In response, the processing circuitry 40 may activate the LiDAR modules 22 to scan the compartment 28 to generate the at least one point cloud 24.

Still referring to FIG. 8, the processing circuitry 40 may calculate a part $v_{seg}$ of the volume V for each body segment of the occupant 26 and sum the parts $v_{seg}$ to determine the volume V of the occupant 26. To calculate the bodyweight of the occupant 26, the processor may multiply the density estimate ρ by a sum of all of the parts $v_{seg}$ of the volume V. For example, each part $v_{seg}$ may be an estimate of the volume of a cylinder (see FIG. 8) with the radius r being a distance from the points 36 to the central axis 134 of each body segment and the height h being the length of the central axis 134.

Following the calculation of the bodyweight, the processing circuitry 40 may employ the machine learning models 66 to train the algorithm for calculating the volume V of each body segment by comparing the resulted bodyweight calculation to an expected bodyweight of the occupant 26. The expected bodyweight may be a range based on a detected height of the occupant 26. For example, the processing circuitry 40 may predict a bodyweight of greater than 100 pounds for an occupant 26 having a height over 5 feet. In other examples, the range is between 100 and 500 pounds and may have a general correlation to a height and/or a width of the occupant 26, as detected by the at least one point cloud

24 of the occupant 26. In this way, the estimation of the bodyweight may become more refined by modifying the parts $v_{seg}$ of the volume V.

For example, as previously described with respect to FIGS. 5 and 7, the central axis 134 for a given body segment may be adjusted based on the skeleton model 130 as selected by the processing circuitry 40. By estimating a more accurate position and orientation of the central axis 134 for each body segment, the volume V for each body segment may be more accurately estimated. Accordingly, by using artificial intelligence and machine learning, the algorithm for detecting the volume V body segment (e.g., the estimation of the part $v_{seg}$ of the volume V for each body segment) may be enhanced iteratively. Further, for occupants 26 having outlying features (e.g., very low bodyweight or height, very high bodyweight or height), more accurate estimations of bodyweight and other biological parameters may be provided by the detection system 10.

According to some examples, the present detection system 10 may further be configured to detect whether one or more of the seats 34 in the vehicle 12 is empty or occupied. As previously described, the keypoints 132*a-z* of an occupant 26 may be estimated by comparing the depth information corresponding to the occupant 26 to the depth information corresponding to the seat 34. The body pose database 128 may be accessed by the processing circuitry 40 in order to determine the various keypoints 132*a-z*, such as a center of a pelvis of the occupant 26, a center of the head 140, a center of the chest 162, or the like. By detecting these keypoints 132*a-z*, the processing circuitry 40 may be configured to determine a tilt or angle of sitting in the seat 34, as well as any other pose of the occupant 26 in the seat 34, by further access to the skeleton model database 126. Accordingly, the various portions of the seat 34 (e.g., backrest, upper part surface 186, lower portion), may be adjusted based on the pose of the occupant 26, the bodyweight of the occupant 26, or any other attribute previously described. Such operations should always be implemented in accordance with the owner manual and safety guidelines. Further, as described in reference to FIG. 7, interference with the alignment vector 168 may be managed by the present detection system 10 by controlling one or more of the restraints 170, 172 of the restraint control system 80. It is also contemplated that other components other than the seat control system 71 and the restraint control system 80 may be adjusted, such as activation or controlling of a sun visor in the vehicle 12 or selective control of light transmittance through the window 182, in response to a pose in which the occupant 26 has raised hands blocking sunlight, may be employed by the detection system 10.

Figure 9:
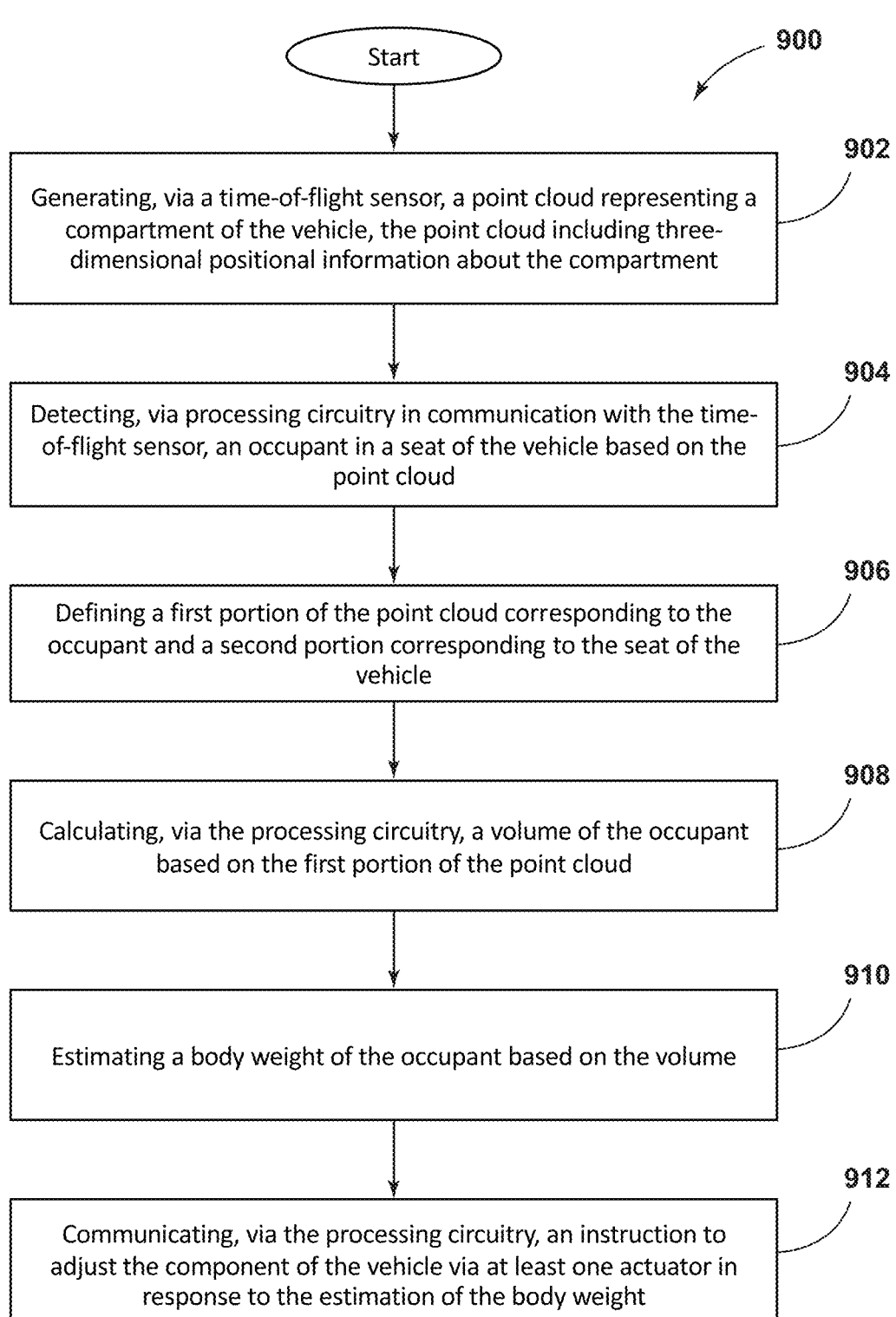
FIG. 9 is a flow diagram representing a method for managing adjustments for a component of a vehicle according to one aspect of the present disclosure.

Referring now to FIG. 9, a method 900 for managing adjustments for the component of the vehicle 12 includes generating, via the time-of-flight sensor 16, the at least one point cloud 24 representing the compartment 28 of the vehicle 12 at step 902. The at least one point cloud 24 includes three-dimensional positional information about the compartment 28. The method 900 further includes detecting, via the processing circuitry 40 in communication with the time-of-flight sensor 16, the occupant 26 in the seat 34 of the vehicle 12 based on the at least one point cloud 24 at step 904. The method 900 further includes defining the first portion 122 of the at least one point cloud 24 corresponding to the occupant 26 and the second portion 124 of the at least one point cloud 24 corresponding to the seat 34 of the vehicle 12 at step 906. The method 900 further includes calculating, via the processing circuitry 40, the volume V of the occupant 26 based on the first portion 122 of the at least one point cloud 24 at step 908. At step 910, the bodyweight of the occupant 26 is estimated based on the volume V. At step 912, an instruction is communicated via the processing circuitry 40 to adjust the component of the vehicle 12, via the at least one actuator 120 in response to the estimation of the bodyweight.

It is contemplated that the at least one actuator 120 may refer to a valve, such as a solenoid valve, a motor, or any other electromechanical device configured to drive the component or otherwise move the component from one position to another. For example, the at least one actuator 120 may include a timer for a valve for the restraint control system 80 that is configured to control deployment 173 of a membrane for the restraint 170, 172. In other examples, the at least one actuator 120 is the positioning actuator 90 for the seat control system 71 to control the position of the seat 34. Such operations should always be implemented in accordance with the owner manual and safety guidelines. Other actuators may be controlled by the processing circuitry 40 in response to determination of the bodyweight of the occupant 26 according to the volume V estimated based on the at least one point cloud 24.

In general, the present detection system 10 may provide for accurate detection of bodyweights, heights, or other biological parameters of the occupant 26, based on time-of-flight using LiDAR. The LiDAR detection employed may allow for effective deployment 173 of the restraints 170, 172 in zones aligned with the alignment vector 168 of the present disclosure, which may be estimated using the depth information gathered from the time-of-flight sensors 16. Thus, the detection system 10 may predict which zones, or spaces, within the compartment 28, the occupant 26 may move through or enter in response to movement of the vehicle 12. Further, enhanced seating arrangements may be provided by the present detection system 10 by monitoring positions of the occupants 26 within the compartment 28 using LiDAR. Further, the present detection system 10 may provide for reduced active sensing hardware (e.g., proximity sensors, capacitive sensors, inductive sensors), or more complex image processing systems (e.g., stereoscopic imagers) while providing accurate depth information.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A system for managing adjustments for a component of a vehicle, comprising:

one or more time-of-flight sensors configured to map a three-dimensional space of an interior of the vehicle and/or a region exterior to the vehicle, wherein the one or more time-of-flight sensors are further configured to generate a point cloud representing a compartment of the vehicle, the point cloud including three-dimensional positional information about the compartment;

at least one additional sensor that is directable by a user toward the three-dimensional space to generate an additional point cloud from a viewing angle different than field-of-views of the one or more time-of-flight sensors already existing on the vehicle, wherein the at least one additional sensor comprises a mobile smart device which is separate from the vehicle and includes at least one LiDAR module;

comparing point clouds generated by the one or more time-of-flight sensors to the additional point cloud to generate a more expansive or more accurate point cloud of a mapped three-dimensional space and provide an updated point cloud;

at least one actuator configured to adjust the component of the vehicle; and processing circuitry in communication with the one or more time-of-flight sensors, the at least one additional sensor, and the at least one actuator, the processing circuitry configured to:

detect an occupant in a seat of the vehicle based on the updated point cloud;

define a first portion of the updated point cloud corresponding to the occupant and a second portion of the updated point cloud corresponding to the seat of the vehicle;

calculate a volume of the occupant based on the first portion of the updated point cloud;

estimate a bodyweight of the occupant based on the volume; and communicate an instruction to adjust the component of the vehicle in response to an estimation of the bodyweight.

2. The system of claim 1, wherein the processing circuitry is further configured to:

calculate a product of the volume of the occupant and a density estimate, wherein the estimation of the bodyweight is based on the product of the volume of the occupant and the density estimate.

3. The system of claim 1, further comprising:

a database in communication with the processing circuitry, the database including skeleton model data, wherein the processing circuitry is further configured to define a skeleton model for the occupant based on the updated point cloud and the skeleton model data.

4. The system of claim 3, wherein the processing circuitry is further configured to:

determine a pose of the occupant based on the first portion of the updated point cloud and the skeleton model.

5. The system of claim 3, wherein the skeleton model includes keypoints corresponding to a central axis of body segments of the occupant, the processing circuitry further configured to:

compare the keypoints to the first portion of the updated point cloud;

calculate a part of the volume for each of the body segments based on a comparison of the keypoints to the first portion; and calculate a sum of the parts of the volume to determine the volume of the occupant.

6. The system of claim 3, wherein the processing circuitry is further configured to:

compare the first portion of the updated point cloud to the second portion of the updated point cloud; and estimate a coronal plane for the occupant based on a comparison of the first portion to the second portion.

7. The system of claim 6, wherein the skeleton model includes keypoints corresponding to the coronal plane of the occupant, and wherein calculation of the volume is based further on the keypoints.

8. The system of claim 7, wherein estimation of the coronal plane is based on the processing circuitry:

detecting a first depth of a front of the occupant based on the first portion;

detecting a second depth of a seating surface of the seat based on the second portion; and calculating an average depth based on the first and second depths.

9. The system of claim 1, wherein the processing circuitry is configured to:

define a third portion of the updated point cloud corresponding to a structural surface of the compartment;

compare the first portion of the updated point cloud to the third portion of the updated point cloud; and adjust an activation of the at least one actuator based on a comparison of the first portion to the third portion.

10. The system of claim 9, wherein the processing circuitry is further configured to determine an alignment vector between the first portion and the third portion of the updated point cloud, wherein an adjustment of the activation is based further on the alignment vector.

11. The system of claim 10, wherein the component includes a restraint configured to align with the alignment vector upon deployment of the restraint.

12. The system of claim 11, wherein adjustment to the activation includes adjusting a timing of the deployment based on a comparison of the first portion to the third portion.

13. The system of claim 1, wherein the one or more time-of-flight sensors include at least one LiDAR module configured to generate the three-dimensional positional information.

14. The system of claim 1, wherein the at least one actuator is configured to adjust the seat.

15. A method for managing adjustments for a component of a vehicle, comprising: mapping a three-dimensional space of an interior of the vehicle and/or a region exterior to the vehicle using one or more time-of-flight sensors; generating, via the one or more time-of-flight sensors, a point cloud representing a compartment of the vehicle, the point cloud including three-dimensional positional information about the compartment; detecting, via processing circuitry in communication with the one or more time-of-flight sensors, an occupant in a seat of the vehicle based on the point cloud; directing at least one additional sensor toward the three-dimensional space to generate an additional point cloud from a viewing angle different than field-of-views of the one or more time-of-flight sensors already existing on the vehicle, wherein the at least one additional sensor comprises a mobile smart device which is separate from the vehicle and includes at least one LiDAR module, the mobile smart device being directable toward the three-dimensional space by a user; comparing point clouds generated by the one or more time-of-flight sensors to the additional point cloud to generate a more expansive or more accurate point cloud of a mapped three-dimensional space and provide an updated point cloud; defining a first portion of the updated point cloud corresponding to the occupant and a second portion of the updated point cloud corresponding to the seat of the vehicle; calculating, via the processing circuitry, a volume of the occupant based on the first portion of the updated point cloud; estimating a bodyweight of the occupant based on the volume; and communicating, via the processing circuitry, an instruction to adjust the component of the vehicle via at least one actuator in response to an estimation of the bodyweight.

16. The method of claim 15, further comprising:

defining a skeleton model for the occupant based on the updated point cloud and based on skeleton model data in a skeleton model database that is in communication with the processing circuitry.

17. The method of claim 16, further comprising:

determining a pose of the occupant based on the first portion of the updated point cloud and the skeleton model.

18. The method of claim 16, wherein the skeleton model includes keypoints corresponding to a central axis of body segments of the occupant, and further comprising:

comparing the keypoints to the first portion of the updated point cloud;

calculating a part of the volume for each of the body segments based on a comparison of the keypoints to the first portion; and calculate a sum of the parts of the volume to determine the volume of the occupant.

19. The method of claim 16, further comprising comparing the first portion of the updated point cloud to the second portion of the updated point cloud; and estimating a coronal plane for the occupant based on a comparison of the first portion to the second portion.

20. A system for managing adjustments for a component of a vehicle, comprising:

one or more time-of-flight sensors configured to map a three-dimensional space of an interior of the vehicle and/or a region exterior to the vehicle, wherein the one or more time-of-flight sensors are further configured to generate a point cloud representing a compartment of the vehicle, the point cloud including three-dimensional positional information about the compartment;

at least one additional sensor that is directable by a user toward the three-dimensional space to generate an additional point cloud from a viewing angle different than field-of-views of the one or more time-of-flight sensors already existing on the vehicle, wherein the at least one additional sensor comprises a mobile smart device which is separate from the vehicle and includes at least one LiDAR module, the mobile smart device being directable by a user;

comparing point clouds generated by the one or more time-of-flight sensors to the additional point cloud to generate a more expansive or more accurate point cloud of a mapped three-dimensional space and provide an updated point cloud;

at least one actuator configured to adjust the component of the vehicle;

processing circuitry in communication with the one or more time-of-flight sensors, the at least one additional sensor, and the at least one actuator; and a database in communication with the processing circuitry, the database including skeleton model data, wherein the processing circuitry is configured to:

define a skeleton model for an occupant based on the updated point cloud and the skeleton model data;

detect the occupant in a seat of the vehicle based on the updated point cloud;

define a first portion of the updated point cloud corresponding to the occupant and a second portion of the updated point cloud corresponding to the seat of the vehicle;

calculate a volume of the occupant based on the first portion of the updated point cloud and the skeleton model data;

estimate a bodyweight of the occupant based on the volume; and communicate an instruction to adjust the component of the vehicle in response to an estimation of the bodyweight.

21. The system of claim 20, wherein the mobile smart device comprises a cellular phone that is selectively directed by the user toward the three-dimensional space.

22. The system of claim 20, wherein the one or more time-of-flight sensors map the three-dimensional space of the interior of the vehicle and the region exterior to the vehicle, wherein the region exterior to the vehicle is a space behind the vehicle adjacent to an entry or an exit to the vehicle to capture point clouds of various features including surfaces and objects present in the region exterior to the vehicle.

23. The method of claim 15, wherein the mobile smart device comprises a cellular phone that is selectively directed by the user toward the three-dimensional space.

24. The method of claim 15, further comprising:

mapping the three-dimensional space of the interior of the vehicle and the region exterior to the vehicle with the one or more time-of-flight sensors, wherein the region exterior to the vehicle is a space behind the vehicle adjacent to an entry or an exit to the vehicle; and capturing point clouds of various features including surfaces and objects present in the region exterior to the vehicle.

25. The system of claim 1, wherein the mobile smart device comprises a cellular phone that is selectively directed by the user toward the three-dimensional space.

26. The system of claim 1, wherein the one or more time-of-flight sensors map the three-dimensional space of the interior of the vehicle and the region exterior to the vehicle, wherein the region exterior to the vehicle is a space behind the vehicle adjacent to an entry or an exit to the vehicle to capture point clouds of various features including surfaces and objects present in the region exterior to the vehicle.

* * * * *